(12) United States Patent
Khmel

(10) Patent No.: US 8,337,156 B2
(45) Date of Patent: Dec. 25, 2012

(54) METHOD OF FLIGHT IN AN EXPANDED SPEED RANGE USING THRUST VECTORING PROPELLERS

(76) Inventor: Dmitry Sergeevich Khmel, Moskovskaya Oblast (RU)

( * ) Notice: Subject to any disclaimer, the term of this patent is extended or adjusted under 35 U.S.C. 154(b) by 0 days.

(21) Appl. No.: 12/824,514

(22) Filed: Jun. 28, 2010

(65) Prior Publication Data

US 2011/0052392 A1     Mar. 3, 2011

Related U.S. Application Data

(63) Continuation of application No. PCT/RU2008/000004, filed on Jan. 9, 2008.

(30) Foreign Application Priority Data

Dec. 28, 2007 (RU) ................................ 2007148793

(51) Int. Cl.
*B64C 11/30* (2006.01)
(52) U.S. Cl. ........................................................ 416/27
(58) Field of Classification Search ............... 416/26, 416/27, 44
See application file for complete search history.

(56) References Cited

U.S. PATENT DOCUMENTS

| 2,328,786 A | 9/1943 | Crowder |
| 2,444,781 A | 7/1948 | Leonard |
| 2,738,148 A | 3/1956 | Stulen |
| 3,106,369 A | 10/1963 | Borst |
| 4,123,018 A | 10/1978 | Tassin de Montaigu |

FOREIGN PATENT DOCUMENTS

| DE | 1406374 A1 | 4/1969 |
| GB | 2103167 A | 2/1983 |
| SU | 1824346 A1 | 6/1993 |

OTHER PUBLICATIONS

Jurjev, "Aerodynamic Calculation of Helicopters", Oborongiz, 1956, pp. 40, 50, 86, 109.
Ruzhitsky, "Vertical Take-Off Aviation", National Publishing House of Defense Industry, 1959, pp. 71, 95, Moscow, Russia.
"Aircraft Designer Directory", ZAGI, 1937, pp. 175, 206, vol. 1.
International Search Report from corresponding application PCT/RU2008/00004 filed on Jan. 9, 2008, mailed on Aug. 21, 2008.

*Primary Examiner* — Dwayne J White
(74) *Attorney, Agent, or Firm* — Patentbar International, P.C.

(57) ABSTRACT

The invention relates to aeronautical engineering, in particular to methods of flight due to creating of forces on air propellers, namely using thrust vectoring of direction and amount of force created by air propellers of opposite rotation with the axis, mainly in the direction of flight, in the expanded range of speeds, from 50 m/s to high near-sonic speed of flight. The invention may be applied for horizontal flight and maneuvering in flight on vertical take-off aircrafts using rotation of main rotors from the vertical stand of rotor axes during the take-off to almost horizontal position of rotor axes in horizontal flight, thus both the rotation of rotors and the change of position of an aircraft together with its rotors may be applied, and it may be also used in the horizontal take-off aircrafts with almost horizontal position of axes during the horizontal flight, including the planes with airscrew propellers.

19 Claims, 17 Drawing Sheets

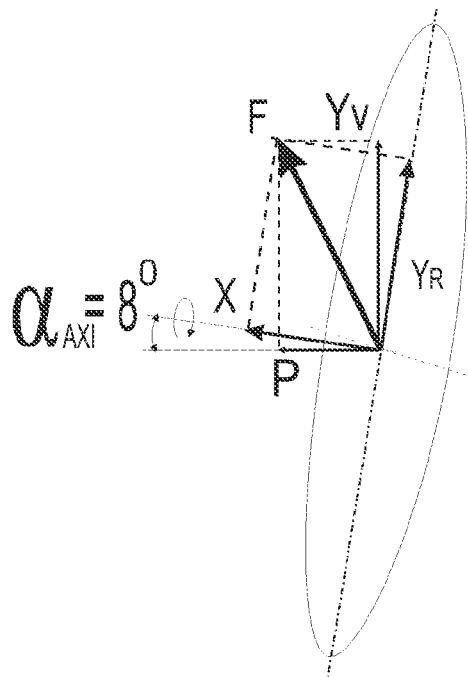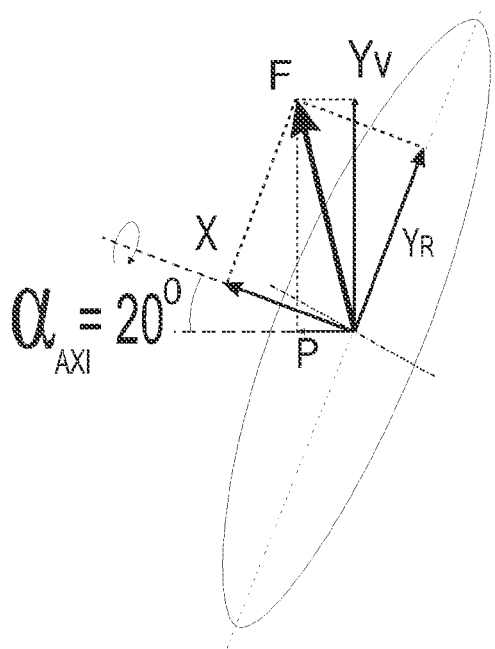
Fig. 22 aFig. 22 b
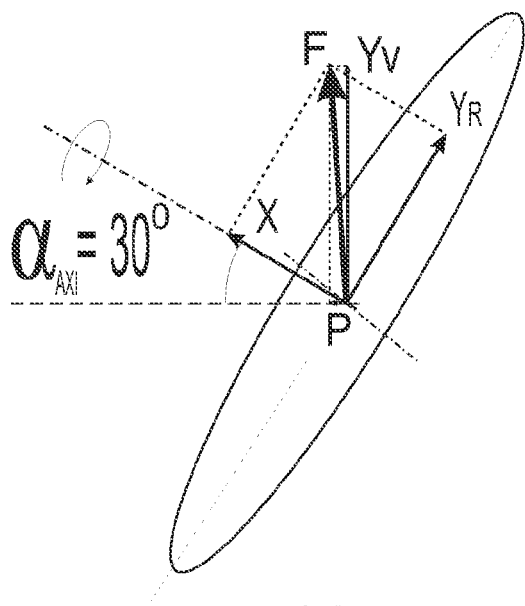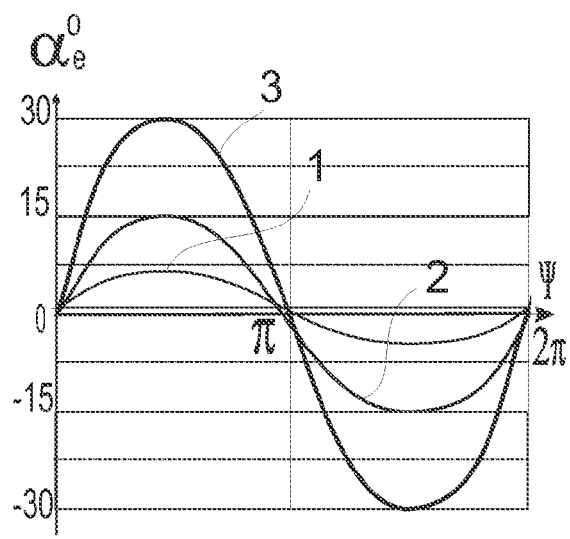
Fig. 22 cFig. 22 d

METHOD OF FLIGHT IN AN EXPANDED SPEED RANGE USING THRUST VECTORING PROPELLERS

RELATED APPLICATIONS

This application is a Continuation of PCT application serial number PCT/RU2008/000004 filed on Jan. 9, 2008 which, in turn, claims priority to a Russian Application serial number 2007148793 on Dec. 28, 2007, both of which are incorporated herein by reference in their entirety.

BACKGROUND OF THE INVENTION

The invention is aimed to solve technical problem of a realization of flight in extended speed diapason producing a required value force in any direction, including lift force for compensation of weight, on air rotors in mainly axial airflow owing to increased efficacy of producing lift and transversal rotor forces in additional to thrust, also in extended diapason of rotor axe inclination to air flow and control of rotor force value and direction owing to variation of thrust and lift rotor air force ratio in wide diapason for various flight mode, also for maneuvering with acceleration. Said problem is solved owing to that in method of flight in extended speed range, using thrust vectoring propellers.

There are known aircrafts using main rotors for flight. Helicopters belong to such a type of aircrafts.

Helicopter is an aircraft rising in the air using one or several propellers pulling it upwards, the propellers are being driven by an engine (B. N. Jurjev, Aerodynamic calculation of helicopters, Oborongiz, 1956, p. 40).

The axis of the main rotor and the device as a whole are inclined forward, and then the drawing force of main rotors T gives the pulling effort X resulting to moving the device. If inclining the machine aside or backwards it is possible to obtain lateral motion and reverse motion (B. N. Jurjev, Aerodynamic calculation of helicopters, Oborongiz, 1956, p. 109).

The inclination of the main rotor of a helicopter is being done using a special device named the wobble plate. This device invented and developed by academician B. N. Jurjev in 1911, is applied in all the modern helicopters (E. I. Ruzhitsky, Vertical take-off aviation, National publishing house of defense industry, Moscow, 1959, p. 71).

Turning the external ring of the wobble plate leads to turn of the internal rotating ring which comes in harmonic oscillation and forces to oscillate the blades about their longitudinal axes. The blade will run one part of the circle with a larger angle of incidence, than the other part, and, hence, the thrust of one half of disk would be higher, than the other (B. N. Jurjev, Aerodynamic calculation of helicopters, Oborongiz, 1956, p. 86).

Using such a method of control for main rotors allows to change the angle of the propeller axis and, accordingly, the direction of vectorial force of the propeller directed transversely to the propeller rotation plane.

The helicopter propeller is located in the horizontal plane and it is being blown in flight by the airflow in the direction close to a the rotation plane that leads to changing the speed of ambient velocity of the coming blade as compared to that of the parting one.

The increase of the maximal speed of flight is limited, mainly, due to the phenomena of stalling on the blade going against the direction of flight and besides, due to the phenomenon of compressibility on the blade going in the direction of flight (E. I. Ruzhitsky, Vertical take-off aviation, National publishing house of defense industry, Moscow, 1959, p. 95).

There are known screw propellers. Those propellers are designed to impart the devices on which they are mounted, to get a translational motion in the direction either conterminous or close to the direction of the axis of their rotation (B. N. Jurjev, Aerodynamic calculation of helicopters, Oborongiz, 1956, p. 50).

The screw propellers may be used in a wide range of speeds as the plane of the propeller is transversal to the stream and there is no nonuniformity of the streamline of blades.

The increase of thrust of the air propeller due to increase of rotational speed is limited by the increase of profile resistance of blades.

There are propellers with a fixed pitch and propellers with adjustable pitch having the blades that may turn in flight about their axes (Aircraft designer directory, Vol. 1, ZAGI, 1937, p. 175).

The advantages of adjustable pitch propeller as compared to the fixed pitch propeller grow at the same time as the range of flight speed increases as the range of angles of incidence of the blades necessary for getting the full power also grows (Aircraft designer directory, Vol. 1, ZAGI, 1937, p. 206).

The increase in rotational speed of screw propellers is limited due to losses connected with compressibility, therefore when increasing the speed of flight the amount of relative speed grows and verges to unity thus defining the amount of advance ratio for air propellers used in aircraft in the range:

$$\lambda = 0 \div 3.5,$$

Where $\lambda$ is the advance ratio of the air propeller.

When flying at high speeds as increasing the advance ratio of the propeller the angles of incidence of the blades are also increased for maintaining the angles of attack of blades, thus the forces created by the propeller blades deviate closer to the plane of rotation, and the losses for swirling the airflow behind the propeller grow.

There is another drawback inherent to propellers used in aircraft: when flying at high speeds they cannot create elevating force for balancing of masses in flight, thus they are used only for creating the thrust.

From the patent literature there is known an aircraft for vertical and horizontal flight, U.S. Pat. No. 2,444,781, B64C29/00, containing a fuselage, one propeller consisting of four equal sized blades and rotating about an axis, aligned with the axis of the fuselage. The propeller is located near the centre of gravity of an aircraft. The aircraft has no wings, but it has wing and vertical fin surfaces for transition from vertical flight to horizontal flight, as well as for control of the aircraft position in flight.

In the same patent a method of flight using the above described aircraft is described. For creating the force, transversal to the axis of the propeller, it is necessary to incline the axis of the propeller in horizontal flight under a small angle to the direction of flight. Therefore, the effective angle of attack changes with according to the angular position of the blade. The angle of attack reaches the maximal value when the blade is horizontal, and becomes zero when the blade is vertical. In horizontal flight it is offered to use a rotating crosswise the screw wing when creating the draft and the torsional moment by jet engines at the ends of screw wings.

Similar development were carried out by other authors using direct-flow jet engines at the ends of blades.

The above aircraft and its method of flight have the following drawbacks.

In the above method at flight at a significant horizontal axial speed, as a result of axial pitch in the vertical plane, the forces directed upwards arise on the wing-blade rotating downwards and on the wing-blade rotating upwards. Therefore, the blades rotating upwards, create forces diminishing the speed. As a result of such a use the propeller creates elevating force, however it does not create thrust, but creates resistance that leads to unjustified expenses of energy for creating thrust for overcoming the force diminishing the speed of the blade rotating upwards by jet engines, mounted at the ends of wings-blades while the thrust and elevating force may be created on the propeller.

Another drawback of the above method of flight is the significant moment transversal to axes of the propeller effecting on the propeller, which should be compensated aerodynamic rudders.

The drawback of the method of creation of elevating force used for flight, transversal to the axis of rotation of the propeller, when the axis is inclined under a small angle to the incident flow, for example, in the vertical plane in horizontal flight, is that in case of rotation under wide angles to the horizontal position and blades close to vertical position the forces created on blades increase the thrust of the propeller, but do not make important contribution to create the lift.

In a number of applications an opportunity of use of coaxial propellers of opposite rotation located near the center of mass, for vertical take-off and flight of an aircraft was considered. Thus the vertical arrangement of the fuselage was used in the take-off and landing phases, while the further horizontal flight at significant speed was carried out due to mounting the propellers under a small angle of the axis to the direction of flight for creating lift and thrust.

One of such aircrafts, U.S. Pat. No. 2,328,786, B64C29/02, B64C29/00, is supplied with a pair of oppositely rotating two-bladed propellers with the axes aligned with the axis of the fuselage. The aircraft is supplied with empennage used for controlling the aircraft position, and with a power-plant bringing propellers to rotation.

To create the thrust necessary for take-off, the blades are rotating in a horizontal plane. After take-off and climb the aircraft gets over to a position for horizontal flight. In this mode of flight the blades rotate in the vertical plane and operate, as propellers of an aircraft flying forward, but at the same time the blades provide the lift for sustaining the aircraft in the air.

The main advantage of the aircrafts using propellers in the axial mode of flow is the absence of strongly pronounced nonuniformity of speeds when rotating the propeller blades. The moments coming to the aircraft from propellers of opposite rotation, laying in the plane of rotation and transversally to planes of rotation of propellers, come to balance.

The main problem of aircrafts using for flight the force transversal to the axis of propellers being in conditions close to axial flow, is creation of lift sufficient for flight and deflection of propeller force upwards, as well as impossibility to incline the axis at wide angles of attack at high speeds of flight.

In the above mentioned patent the conditions of creation of lift of sufficient value, the conditions of its adjustment and provision of absence of the phenomena of shock stall on propeller blades are not determined. Besides the conditions allowing to achieve the absence of sectors where blades are flowed under negative angles of attack are not determined.

The drawback of the method of creation of elevating force used for flight, transversal to the axis of rotation of the propeller, when the axis is inclined under a small angle to the incident flow, for example, in the vertical plane in horizontal flight, is that in case of rotation under wide angles to the horizontal position and blades close to vertical position the forces created on blades increase the thrust of the propeller, but do not make important contribution to create the lift.

There is also known an aircraft of a partly convertible type, U.S. Pat. No. 4,123,018, B64C29/02, B64C29/00, B64C27/10, having, at least, two oppositely rotating propellers with the axes coincident with the axis of the fuselage. Thus in flight the axis of the fuselage is inclined from a vertical position to horizontal position. Each propeller consists of a sleeve, carrying radially located blades attached to a shaft with an axis, fixed on the axis of the fuselage inside the fuselage with a drive to control the cyclic and collective pitch of propellers.

In the above aircraft there is no empennage, while the control of angular position is carried out by creating moments on the propeller using a wobble plate to operate the aircraft and get it over under the necessary angles in flight from vertical during take-off up to close to horizontal in flight.

The advantage of the above aircraft and method of realization of flight is the use of control of cyclic step of propellers for creating moments in the set direction, as well as, for example in helicopter propellers, and in this case wobble plate is applied to control of the position of an aircraft and its propeller, including the case when the propeller axis is pointed in the direction of flight in conditions of a flow of propellers, close to the axial flow.

The drawback of the method of creation of elevating force used for flight, transversal to the axis of rotation of the propeller, when the axis is inclined under a small angle to the incident flow, for example, in the vertical plane in horizontal flight, is that in case of rotation under wide angles to the horizontal position and blades close to vertical position the forces created on blades increase the thrust of the propeller, but do not make important contribution to create the lift.

In the above mentioned engineering solution the conditions of creation of lift of sufficient value, the conditions of its adjustment and provision of absence of the phenomena of shock stall on the propeller blades are not determined. Besides the conditions allowing to achieve the absence of sectors where blades are flowed under negative angles of attack are not determined.

There is a known aircraft and method of its flight, U.S. Pat. No. 3,106,369, B64C9/38, B64C11/40, B64C29/00, B64C9/00, B64C11/00, B64C29/00 in which it is offered to use a radial force: the force transversal to axes of propellers, in horizontal flight of an aircraft with two swivelling propellers of opposite rotation mounted on a supporting girder-wing.

Besides there is known an aircraft, DE1406374, B64C29/00, B64C29/00, having four rotary propellers at the ends of tandem-type located wings, using the same method of flight.

In the above aircrafts the propellers are places on the wings which are being used as supporting girders for mounting the propellers, and also used for control and if necessary for creating additional lift alongside with propellers.

For increasing the force, transversal to the propeller axis, the inclination angle of the axis about the direction of flight is increased, and to control the value of draft of the propeller the blades installation angles are changed.

The above aircrafts perform horizontal flight at high speeds using propellers. It is reached due to incline of propellers axes from the vertical position used at low speeds, to a position when the axis makes an angle from 5° to 10° with deflection of the front end of the axis of propellers upwards in about the direction of flight, after achieving the speed of flight at which the weight of the aircraft is counterbalanced by the force, transversal to the propeller axis.

Thus each propeller creates a radial force, transversal to the axe of rotation, providing the main part of lift in flight, when the propeller axis is at an angle to the flow, and a drawing force for overcoming the resistance.

Use of blades being wide and rectangular at their roots, narrowed to the ends, allows to create the lift close to weight when achieving high transsonic speed if the propellers are directed alongside the flow.

Distribution of angles of attack to propellers is defined upon achieving the design speed of flight by the angles of installation of blades and the axis angle about the direction of the incident flow within the specified limits.

It is known, that CURTISS WRIGHT CORP has constructed a number of aircrafts based on the above mentioned patents.

In particular, an experimental vertical take-off and landing (VTOL) aircraft with two rotary propellers X-100 was built. It is a new type VTOL with rotary air propellers creating radial force in horizontal flight.

It is known, that in 1960 there was a successful flight with transition from vertical take-off to horizontal flight using the lift due to propellers mounted with their axes are directed towards the flight.

There is also a known VTOL X-19, being an aircraft with tandem arrangement of wings and four rotary propellers at the ends of wings.

It is known from specifications, that in horizontal flight the above mentioned devices use the peripheral speed of rotation of propellers characteristic for high-loaded air propellers which peripheral speed values fall within the transsonic range and this speed is not lower than the maximal speed of flight (<http://www.nasm.si.edu/research/aero/aircraft/curtiss_x100.htm>).

The drawback of these aircrafts, such as X-100, X-19 and of the method of their flight, is that achievement of radial force directed transversally to the propeller axis, becomes possible only at high transsonic speeds of flight comparable to the peripheral speed of propellers.

The drawback of the method of creation of elevating force used for flight, transversal to the axis of rotation of the propeller, when the axis is inclined under a small angle to the incident flow, for example, in the vertical plane in horizontal flight, is that in case of rotation under wide angles to the horizontal position and blades close to vertical position the forces created on blades increase the thrust of the propeller, but do not make important contribution to create the lift.

During the horizontal flight with lift on the propellers the axis angle to the incident flow of lift on propellers may vary from 5° to 10°, the conditions of use of the method, allowing to achieve the absence of the phenomena of stalling from the blades when increasing the angle of installation of blades if the angles of the axis to the flow are wider then 8° are not determined.

The conditions of use of the method, allowing to achieve the absence of sectors where the thrust reversion occurs are not determined. The use of angles of the axis of propellers close to 10°, in case of rotation of the blade upwards in horizontal flight leads to occurrence of negative angles of attack of blades that reduces the thrust of the propeller while increasing the force in the plane of propellers. This leads to unjustified expenses for overcoming the force diminishing the speed arising on blades on these areas of the propeller.

Use of smaller angles of axes to the flow, not resulting to formation of a reversal area, leads to redundant thrust when creating the lift necessary for maintaining the weight. For reducing the thrust it is necessary to reduce the angles of installation of blades of the propeller that can lead to occurrence of a thrust reversal area on the propellers.

Use of propeller operation modes having high peripheral speed with values of relative speed of the propeller less then unity if the propeller is mounted under an angle to the flow stream results in that on the ends of blades where the peripheral speed gets its greatest value, when rotating from vertical to horizontal position, to variation of angles of attack more than twice, than the variation of angles of attack at the blade root where the peripheral speed gets its least value therefore the increase of the angle of the axis the with respect to the flow is limited by increase of angles of attack at the root propeller while the end portion of the blade does not reach the maximal increase in angles of attack at blade positions close to horizontal.

Thus the drawback is limitation of the axis angle with respect to the flow direction in case of flight of an aircraft at high speeds, the phenomena of shock stall at high angles of the axis with respect to the flow and initiation of an area of thrust reversion on the propeller. The narrow range of angles of the propeller axis with respect to the flow providing the possibility of flight, complicates the transition from flight with the axes located vertically, to flight with the axes located in the direction of horizontal flight.

The method of flight of an aircraft most close to the offered invention is U.S. Pat. No. 2,738,148, B64C23/00, based on obtaining of lift on blades of propellers of an aircraft.

From the prior knowledge it is known that, when inclining the axis of propeller under a small corner with the direction of the incident flow moving at a high speed, a lift occurs. It is known as a "side force" of propeller that leads to course shift of an aircraft. When increasing the angle of attack of an aircraft to higher values there is "side force", entailing vibrations of propeller blades. Thus the downsweeping blade creates a higher lift, than the blade in vertical position, and each upsweeping blade creates smaller lift, than the blade in vertical position. The change of lift of the blade is cyclic at propeller rotation frequency. The lift fluctuations on each blade lead to oscillations of the blade with the propeller rotation frequency, thus increasing tension in the blade. The lift increase occurs from the vertical position of the blade to the maximal value when the blade is horizontal, and drops when the blade is vertically downwards. For a propeller having three or more blades, summation of the increased and reduced vertical components of forces of blades results in steady force, normal to the propeller axis.

In the above mentioned patent it is offered to carry out horizontal flight of an aircraft using lift on the propeller. Thus the part of normal lift is created by the wing, but no more than a half of the required lift for horizontal flight.

The lift is due to propellers of opposite rotation located in pairs in front and rear from the center of weight of the aircraft. The axes of propellers are directed in the direction of flight. For making the lift on propellers in horizontal flight the aircraft is being speeded up till minimal transsonic speed and operated so that the propeller axes in vertical plane have deviated by a positive angle from 2° up to 12° to the flow.

The drawback is that propellers develop significant radial force only at high speeds of flight when speeds of flight become comparable to peripheral speed of rotation of propellers.

The drawback of the method of creating the lift used for flight, transversal to the axis of rotation of the propeller, in case of deflection of the axis under a small angle to the incident flow, for example, in the vertical plane in horizontal flight, is that when rotating under wide angles to the horizontal and blades position close to vertical the forces build on the blades increase the thrust of the propeller, but do not make significant contribution for the lift.

In horizontal flight when creating the lift on propellers the angle of the axis to the direction of incident flow may vary from 2° up to 12°, but the conditions of use of the method, allowing to achieve the absence of phenomena of shock stall on the blades when increasing the angle of installation of blades if the axis angles with respect to the flow exceed 8°, are not defined.

When using on propellers a deflection of the axis at angles of the axis with respect to the flow up to 12° the thrust sharply falls in case of negative angles of attack on blades during upward rotation in horizontal flight. Decrease in thrust and increase in force, transversal to axes of propellers, as well as the lift allows to get the flight on propellers with normal for propellers high peripheral speed of rotation, but this leads to unjustified expenses for overcoming the forces diminishing the speed, arising on the reversing portion of the propeller. The conditions of flight without sectors of power reversion are not determined.

Use of smaller angles of axes to the flow, not resulting in reversal area, results in lift necessary for maintaining the weight, the thrust value would be redundant, and for reducing the latter it is required to reduce the angles of installation of the propeller blades that may lead to negative angles of attack and the reversal area on a part revolution when at rotating the blade upwards in horizontal flight.

Use of modes of propeller with high peripheral speed having values of relative speed of the propeller of less than unity leads in case of installation of the propeller under an angle to the flow to that at the ends of blades where the peripheral speed gets the greatest value, when rotating from vertical to horizontal position, the variation of angles of attack is more than twice less, than the variation of angles of attack at the blade root where the peripheral speed takes the least size therefore the increase of the angle of the axis to the flow is limited by the increase of angles of attack at the root propeller while the end part of the blade does not reach the maximal increase of angles of attack in case of blade positions close to horizontal.

Thus the drawback is limitation of the angle of axis to the flow direction at flight of the aircraft at a high speed, the phenomena of shock stall at high angles of axis to the flow and an area of power reversion on the propeller. The narrow range of angles of axis of propeller to the flow where the flight is possible, complicates the application of this method for transition from vertical take-off with axes located vertically, to flight with the axes located in the direction of horizontal flight. Creation of a part of lift using a wing leads to additional thrust power expense for overcoming the wing resistance when all the necessary forces for flight may be created on propellers.

The main advantage of the offered methods of flight on propellers, is that creating the lift on propeller located in an axial flow allows to increase some times the flight speed on propellers, as compared to helicopters having the flight speed limited by nonuniformity of the flow of the main rotors rotated around of axes to the flight direction. Using such a method of horizontal flight is especially specific for aircrafts using the swivel of main rotors from the position with vertical axes of propellers at take-off to almost horizontal position of axes in horizontal flight and allows a vertical take-off for aircrafts vertical, in the same way, as well as a helicopter, and the flight on propellers at a speed considerably exceeding the helicopter flight speed.

The main advantage of the offered methods of flight on propellers, is that creating the lift on propeller located in an axial flow allows to increase some times the flight speed on propellers, as compared to helicopters having the flight speed limited by nonuniformity of the flow of the main rotors rotated around of axes to the flight direction. Using such a method of horizontal flight is especially specific for aircrafts using the swivel of main rotors from the position with vertical axes of propellers at take-off to almost horizontal position of axes in horizontal flight and allows a vertical take-off for aircrafts, in the same way, as well as a helicopter, and the flight on propellers at speeds considerably exceeding the helicopter flight speed.

Developing aircrafts having such a position of main rotor have some difficulties due to obtaining a sufficiently high lift regarding the thrust. There were some designs of propellers having wide root portions for increasing the radial force in flight were. However the lift, sufficient for flight at the mentioned speeds, was obtained only at high speeds of flight thus complicating the transition to flight using radial force without wing support. Using the supporting wing alongside with propellers increases the weight and resistance of the aircraft, and also results if arranging the propellers at the end of a wing, to additional oscillations in the wing design.

The main drawback of the offered methods of creating of force, transversal to the propellers axis in the axial flow, is the impossibility of creating an enough the high lift in horizontal flight, due to creating a force, being transversal to the propellers axis. A low efficiency of expenses of capacity for creating a thrust when creating a thrust on the propeller. High speeds of flight where it is possible to create a significant lift on the propellers having their directed towards the flight.

The drawback is the limitation of the angle of axis to the flow direction when flying at high speeds with the phenomena of shock stall and occurrence of an area of power reversion on the propeller. A narrow range of angles of the propeller axis to the flow and a narrow range of speeds at which creating the force, transversal to the axis of rotation of the propeller is possible, for realizing the flight complicates the feasibility of transition from vertical position of axes of propellers at take-off to horizontal flight with axes of rotation of propellers alongside the flight direction.

Besides, the conditions of use of the method allowing to achieve the absence of shock stall on the blades are not determined, the conditions of use of the method allowing to achieve the absence of sectors of the power reversion are not determined as well.

SUMMARY OF THE INVENTION

It is a general object to provide method consists in that at least for two counter-rotating propellers with alterable blade setting angle, propeller axes are set along the flight direction. When moving propeller in the airflow incoming along propeller axis:

$\phi_{oIII}$ are increased for establishing on propeller blades $\alpha_{n0}$ angles of attack, thus producing thrust to ensure sustaining and increasing of the airspeed;

where $\phi_{oIII}$—collective pitch angle where $\alpha_{n0}$—angle of attack of the propeller blade section in axial in-flight flow propeller axes are offset from incoming airflow direction on a $\alpha_{och}$ angle, generating a force normal to the propeller axes in direction of forward propeller axes ends offset where $\alpha_{och}$—propeller axis setting angle relative to the incoming air direction force magnitude is increased in proportion to the airspeed increase and increase of propeller axis angle, relative to direction of the airflow;

achieve speed at which magnitude of mentioned force is close to the weight of aircraft and ensure forward propeller axes ends to be offset up, to create lifting force needed for the flight reaching the airspeed not less than 50 m/s, the propeller is spinned down and its advance ratio is set within the following limits:

$$V_{OTH} = \frac{V_{осн}}{U} = 1,2 \div 3;$$

where $V_{oTH}$—relative propeller speed
where $V_{осн}$—speed of the free flow incoming along propeller axis
where U—propeller blade tip speed
$\phi_{oIII}$ angles are increased with increase of relative propeller speed, ensuring blades' angles of attack not leading to the shock stall, with possibility to increase force, normal to the propellers' axes, while propeller tip speed decrease, axes of the counter-rotating propellers at the same time are set in one direction, to the incoming airflow, in the following angle range:

$$\alpha_{осн} = 0° \div 45°,$$

with possibility of cyclic variation of the blade pitch angle along with creation of maximal blade pitch angle difference on first half-turn in sector between 60° and 120°, with respect to the pitch angles in sector between 240° and 300° on second half-turn on each propeller, counting by rotation from azimuthal locations directed from the center by radius to one given direction, at $\alpha_{осн} > 2°$, propeller axes are pitched in given direction, creating herewith maximum pitch angles during blade turn on one propeller on the side opposite to the sector, on which maximum pitch angles are created on the counter-rotating propeller. Similarly to mentioned above, minimum pitch angles are ensured during blade turn on one propeller on the side opposite to the sector, on which minimum pitch angles are created on the counter-rotating propeller; with possibility of:

ensuring absence of shock stall;
equalization of counter-rotating propellers' moment;
creation of the forces, normal to the propellers' axes in given direction and control of its values, variation of the difference between maximal and minimal pitch angles during blade turn on each propeller;
control of direction and value of the force, created by propellers as well as creation of lifting force and thrust or deceleration force with possibility of cruise or manoeuvre flight.

In addition,
when setting the propeller axes to the angle ranging from 0° to 2° with respect to the incoming airflow, the blade pitch angles are varied cyclically, reaching their maximal angle values during revolution on the rotation sector ranging from 60° to 120°, reading from the given direction; with generation, alongside with thrust, of the force, normal to the propeller axes in given direction;
increase of this normal force value along with increase of maximal blade pitch angles during revolution not more than values of the angles, at which the shock stall is observed;
when setting the propeller axes at an angle ranging from 2° to 8° in given direction, a force normal to the propeller axes in given direction is created with possibility of increase of its value using cyclic blade pitch angle variation. Such variation is essential for creating maximal pitch angles during revolution and not exceeding ones on a revolution sector between 60° and 120° referring from given direction, at which shock stall is detected;
when setting the propeller axes at an angle ranging from 8° to 45° in given direction, the blade pitch angles are varied cyclically to reach minimal pitch angles during revolution in sector between 60° and 120° referring from given direction thus ensuring decrease of blade angles of attack to values, at which shock stall is not observed; with possibility of creation alongside with thrust, of the force, normal to the propeller axes in given direction and increase of its value during increase of the values of minimal blade pitch angles during revolution.

In addition, blade pitch angles are set to $\phi_{oIII}$, equal to the angles, at which, in axial propeller flow, creation of blades' attack angles $\alpha_{л0}$ is ensured, in this respect following inequation is ensured:

$$\alpha_{л0} + \alpha_{осн} + \Delta\phi_1 < \alpha_{крит},$$

where $\Delta\phi_1$—value, on which blade pitch angles in first half of revolution are maximally changed, in relation to the collective pitch angles in case of the use of cyclic blade pitch angle variation
where $\alpha_{крит}$—is the angle of attack causing the air flow shock stall on the blade with possibility of cyclic pitch angles variation in relation to collective pitch angles in first half of revolution, accordingly to:

$$\phi_{ycT} = \phi_{oIII} + \Delta\phi(\phi),$$

where $\phi_{ycT}$—current blade pitch angle
where $\Delta\phi(\phi)$—value, on which blade pitch angles are changed, relative to the collective pitch angles, in azimuthal rotation of blade at the angle $\phi$
where $\phi$—current angle in azimuth in plane of rotation, formed, if looking to the propeller rotation, between blade and given direction.
for creation of maximal pitch angles change on value $\Delta\phi_1$ in first half of revolution on a rotation sector lying in the range between 60° and 120° if counting from given direction, with possibility of creation of attack angles, not leading to the appearance of shock stall, at which following inequation is ensured:

$$\Delta\phi_1 < \alpha_{крит} - \alpha_{л0} - \alpha_{осн},$$

herewith, at the angle $\alpha_{осн}$, which complies with inequation:

$$\alpha_{осн} < \alpha_{крит} - \alpha_{л0},$$

value $\Delta\phi_1 > 0$, where reaching maximal pitch angles in first half of blade revolution on rotation sector, lying in range between 60° and 120° if counting from given direction, achieving change of $\phi_{ycT}$ relatively to $\phi_{oIII}$ on a value $\Delta\phi_1 = \phi_{ycT} - \phi_{oIII}$, and angles of $\alpha_{осн}$, ensuring inequation:

$$\alpha_{осн} > \alpha_{крит} - \alpha_{л0},$$

value $\Delta\phi_1 < 0$, where cyclically changing blades' pitch angles for to decrease blades' pitch angles with creation in first half of revolution on rotation sector lying in the range between 60° and 120° if counting from given direction, minimal blade pitch angles with possibility of creation of attack angles ensuring absence of shock stall.

In addition, when rotating the blade if counting from the set direction on the second half-turn the following equation is reached:

$$\phi_{ycT} = \phi_{oIII}$$

thus the $\phi_{oIII}$ is set equal to angles which at an axial flow of propeller provide creating the angles of attack $\alpha_{\pi 0}$ on the blade and the following inequation observed:

$$\alpha_{och} < \alpha_{\pi 0},$$

and increasing collective blade pitch angles $\phi_{oIII}$ to ensure non-negative attack angles in second half of revolution on a rotation sector lying between 240° and 300°, with possibility of creation of: the force normal to the propeller axis in given direction; the thrust.

In addition, when rotating of the blade if counting from the set direction on the second half-turn the following equation is reached:

$$\phi_{ycT} = \phi_{oIII},$$

the $\phi_{oIII}$ is reached, equal to angles which in case of axial flow on propeller provide the angles of attack equal to $\alpha_{\pi 0}$, while observing the inequation:

$$\alpha_{och} > \alpha_{\pi 0},$$

with a possibility of increasing the force, normal to the axis of propeller in the set direction, in case of simultaneous drop of thrust of the propeller.

In addition, the $\phi_{oIII}$ is set equal to angles which at an axial flow on the propeller provide creating angles of attack $\alpha_{\pi 0}$, on the blade while observing the inequation:

$$\alpha_{\pi 0} - \alpha_{och} + \Delta\phi_2 \geq 0,$$

where $\Delta\phi_2$—value, on which blade pitch angles are maximally offset, in second half of revolution, in relation to the collective pitch angles
the blades setting angles of propeller are cyclically altered and reach the maximal value $\phi_{ycT}$ when rotating on the sector of rotation ranging from 240° to 300° if counting from the set direction, in the second half-turn with respect to $\phi_{oIII}$ as follows:

$$\Delta\phi_2 > \alpha_{och} - \alpha_{\pi 0},$$

with a possibility of increasing the force, normal to the axis of propeller in the set direction and creating thrust on the propeller.

In addition, $\phi_{oIII}$ are set equal to angles which, in axial propeller flow provide angles of attack of $\alpha_{\pi 0}$ while ensuring inequation:

$$\alpha_{\pi 0} - \alpha_{och} + \Delta\phi_2 < 0,$$

with that blades pitch angles are cyclically varied in second half of revolution, reading rotation-wise from given direction maximally on $\Delta\phi_2$ while ensuring inequation:

$$\Delta\phi_2 < \alpha_{och} - \alpha_{\pi 0}$$

with a possibility of increasing the force, normal to the axis of propeller in the set direction, in case of simultaneous drop of thrust of the propeller.

In addition, the setting angles of blades in the first half-turn are cyclically altered, if counting from the set direction, according to the following equation:

$$\phi_{ycT} = \phi_{oIII} + \Delta\phi_1 \sin(\phi)$$

In addition, the setting angles of blades in the first half-turn are cyclically altered, if counting from the set direction, according to the following equation:

$$\phi_{ycT} = \phi_{oIII} + \Delta\phi_1 \sin(\phi)$$

and in the second half-turn of revolution, if counting from the set direction, according to the following equation:

$$\phi_{ycT} = \phi_{oIII} + \Delta\phi_2 \sin(\phi).$$

In addition, in first half of revolution on rotation sector lying between 0° and 75°, reading rotation-wise from given direction, pitch angles are increased to reach its maximal values on first half of revolution while not allowing pitch angles to decrease on value more than 2° on sector starting between 60° and 75°, and ending between 95° and 120°.

In addition, in first half of revolution on rotation sector lying between 0° and 75°, reading rotation-wise from given direction, pitch angles are increased to reach its maximal values on first half of revolution while not allowing pitch angles to decrease on value more than 2° on sector starting between 60° and 75°, and ending between 95° and 120° and in the second half-turn on the sector of rotation ranging from 180° to 245°, if counting from the set direction, the setting angles are reduced, the setting angles reach the least value on the second half-turn and increasing the angles over 2°, on the sector beginning between 240° and 255° and terminating between 285° and 300° is prevented.

In addition, the following angles are set establish:

$$\phi_{oIII} = \phi_{ycT\phi}$$

where $\phi_{ycT\phi}$—pitch angle, at which propeller feathering in its axial flow is ensured, with possibility of ensuring minimal blades' attack angles.

and in case of rotation of the blade on the sectors ranging from 0° to 45° and from 135° to 360°, if counting from the set direction, the setting angles with respect to angles of the main pitch cyclically vary according to equation:

$$\phi_{ycT} = \phi_{oIII} + \Delta\phi_2 \sin(\phi),$$

moreover the value is set:

$$\Delta\phi_2 = \alpha_{och}$$

with a possibility of varying the setting angles for maintaining on the blade the angles of feathering in various azimuthal positions during the blade rotation within the limits of specified sectors.

In addition, there is an additional alteration of blade setting angles during revolution, while reducing as much as possible the setting angles achieved on each propeller on azimuths, laying in the same direction on each propeller, and being increasing as much as possible on opposite azimuths with a possibility of creating the moment normal to axes of propellers.

In addition, the tail plumage for stabilizing the aircraft is used, the aerodynamic rudders are deflected upwards or downwards for creating the moments and controlling the flight direction, the aerodynamic rudders are deflected to the right or to the left for creating the moments and controlling the angular position in the traveling direction, the aerodynamic rudders which on the left and on the right in the opposite sides are deflected for creating the moments and controlling the angular flight bank.

In addition, the wing is used and it is oriented to the incoming air flow at an angle of attack ranging from 0° to 10° for increasing the additional lift supporting in flight while increasing the angle of attack, and for controlling the bank of aircraft in flight the wing ailerons deflection may be used.

In addition, the specified relative speed of the propeller is reach by reducing the peripheral speed of the propeller, due to variating the radius of propellers, with a possibility of increasing the force, normal to the axis of the propeller, to the thrust in process of reducing the radius of propellers.

In addition, at least, one additional propulsor for creating the thrust is used.

In addition, the blades of propellers on the sleeve are fixed hingedly or hingedly with elasticity in rigid support with a possibility of use of aerodynamic loads arising as a result of altering the aerodynamic during a revolution of oscillations of the blade around of the hinge in embedding for obtaining an alteration of angles of attack of blade with the purpose of nonadmission of angles of the attack resulting in air flow shock stall, as well as for altering the peripheral speed of the ends of blades during a revolution.

In addition, whereas there is a use of cyclic alteration of structure shape or cyclic alteration of aerodynamic surfaces set on the blades, or cyclic blowing of air currents on the sector of rotation in the first half-turn, ranging from 60° to 120°, if counting from the set direction, with a possibility of increasing in the rotation when rotating in the specified sector and use increasing the force, normal to the axes of propellers in the set direction.

BRIEF DESCRIPTION OF THE DRAWINGS

FIG. 22—diagram of changing glide angle during revolution in connection of rotor axe pitch at different angles to airflow.

DESCRIPTION OF THE PREFERRED EMBODIMENT

The aircraft required for realization of the offered method, has, at least, two counter-rotating air propellers of opposite rotation, with alterable blade setting angle.

Figure 13:
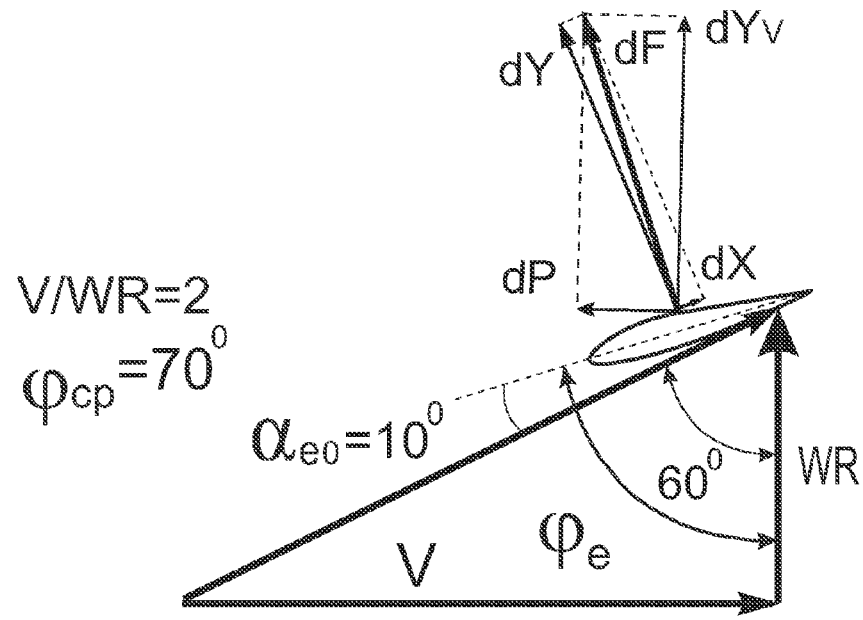
FIG. 13—vector diagram of flow around rotor blade element in axial flow mode.

The offered method of flight is carried out when the aircraft moves at a speed not less than 50 km/s. The propeller axes are set along the flight direction and when moving the propeller in the airflow incoming along the propeller axis, the blade setting angle increases, thus increasing the angle of collective pitch $\phi_{oIII}$. Thus the angles of attack $\alpha_{n0}$ (FIG. 13) on the propeller blades are established which in case of axial flow remain constant during the propeller blade revolution, and produce the thrust which, in turn, provides sustaining the aircraft and increasing the airspeed. As the airspeed increases the angle of collective pitch $\phi_{oIII}$ increases as well for maintaining the angles of attack $\alpha_{n0}$ on the propeller blades thus the forces created by blades of the propeller, deviate closer to the plane of propeller rotation.

Then the propeller axes are offset from the incoming flow direction at an angle $\alpha_{ocu}$, and the force, normal to propeller axes in the direction of deflection forward ends of propellers axes is obtained. The value of this force is increased while increasing the flight speed and the propeller axis angle of in the direction of an incoming airflow. Thus the speed at which the magnitude of this force is close to the weight of the aircraft is reached, thus providing deflection of the forward ends of propellers axes to be offset up for creating the lift required for the flight.

The force, normal to the propeller axes, results from rotating the propeller blades axis thus deflecting them from the direction of the airflow.

Let's consider the propeller with an axis directed under a angle to the direction of an airflow, rotating at a speed W. In the cross-section of the propeller blade with a current radius r, rotating with peripheral speed W*r at a position of the blade close to horizontal at an azimuthal angle $\Psi=90°$, where $\Psi$ is the angle in the plane of rotation, formed alongside the propeller rotation between the blade and the set direction with respect to this set direction.

Figure 1:
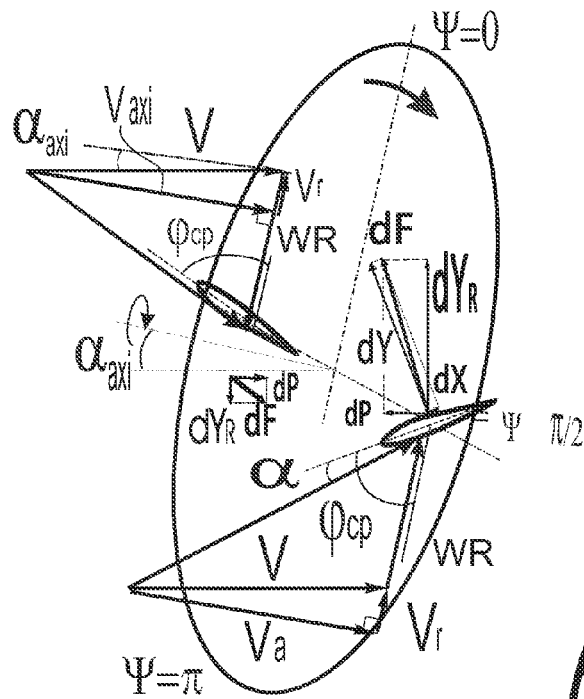
FIG. 1—vector diagram for blade element of rotor with the axe inclined to the direction of the airflow.

The angle of attack increases and reaches its highest value, the projection to the plane of the propeller $dY_R$ also grows, and at $\Psi=270°$ the angle of attack on the contrary decreases (FIG. 1).

When considering in the coordinate system connected to the propeller, the airflow proceeding through the propeller plane at a speed $V_{ocu}$, where $V_{ocu} = V^*\cos(\alpha_{ocu})$ is a component of speed of undisturbed airflow on the propeller axis, and the peripheral speed W*r increasing from the axis to periphery, define the angles of air inflow to blades, and angles of the collective pitch $\phi_{oIII}$ define the blade setting angle and provide the angles of attack creation on blades $\alpha_{n0}$.

The component of speed of the undisturbed airflow V on the radius of propeller axis $V_{pan}$ creates an airflow in the plane of rotation of the propeller which is directed sometimes in the direction of rotation of the blade, sometimes against rotation. Therefore on each section of the blade there is an alteration of angles of attack $\alpha$, where $\alpha$ is the angle of attack of a section of propeller blade with respect to angles $\alpha_{n0}$ on blades, this alteration reaches its maximal value at an azimuthal angle of the blade $\Psi=90°$ with increase at an amount not exceeding above $\alpha_{ocu}$ and at an azimuthal angle of the blade $\Psi=270°$ with reduction at an amount not exceeding $\alpha_{ocu}$. Moreover when moving away from the center of rotation in process of increase of peripheral speed W*r the value of angles alteration decreases.

Figure 2:
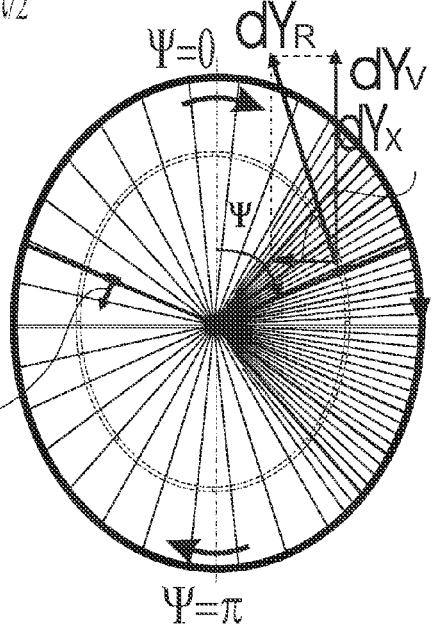
FIG. 2—vector diagram of forces on blade elements in normal to fight direction plane.
Figure 3:
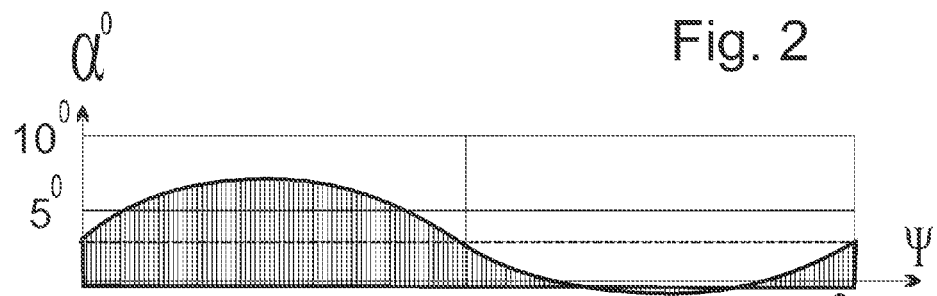
FIG. 3—diagram of the blade element angle of attach variation during revolution of rotor with the axe inclined to the direction of the airflow.

In FIG. 2 there is the force working on an element of the blade in vertical plane when rotating in positions of the blade, distinct from horizontal, and its projection to vertical and horizontal directions. In the diagrams the increased number of lines from the center along the radial direction shows the blade positions where high aerodynamic forces are created. For propellers used in aircraft at highest speeds of flight the relative speed of propeller air $V_{oTH}=1$ may be reached, $$V_{OTH} = \frac{V_{ocu}}{U}$$

Where U=W*R is peripheral speed of the ends of the propeller blade.

Figure 9:
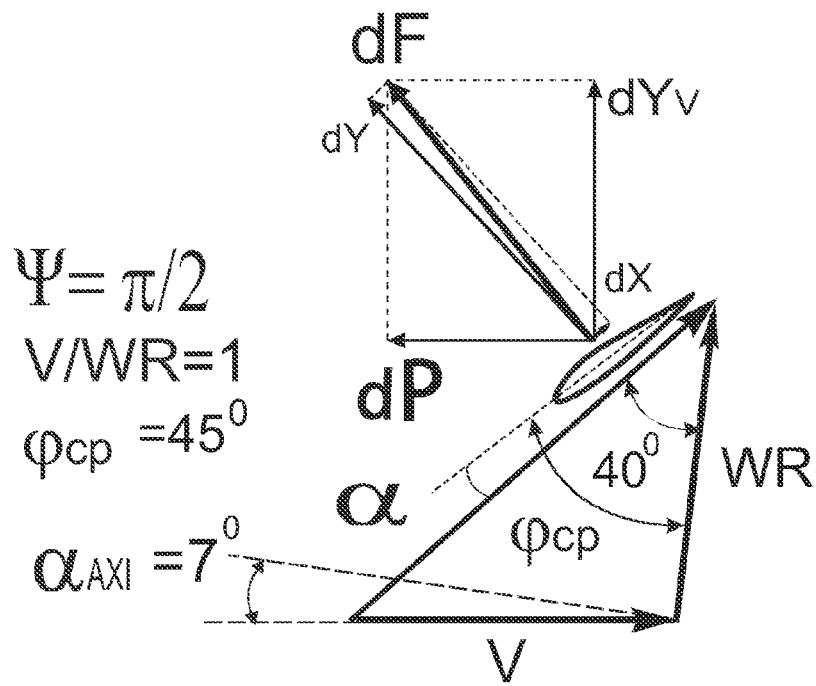
FIG. 9—vector diagram for blade element with speed of airflow equal to the blade tip speed $V_{rel}=1$.

The relative pitch of propeller, normally, does not exceed 3 and the full force dF, working on an element of propeller blade, located on the radius close to radius of propeller R, considerably deviates from the propeller plane, towards creation of thrust (FIG. 9).

Figure 7:
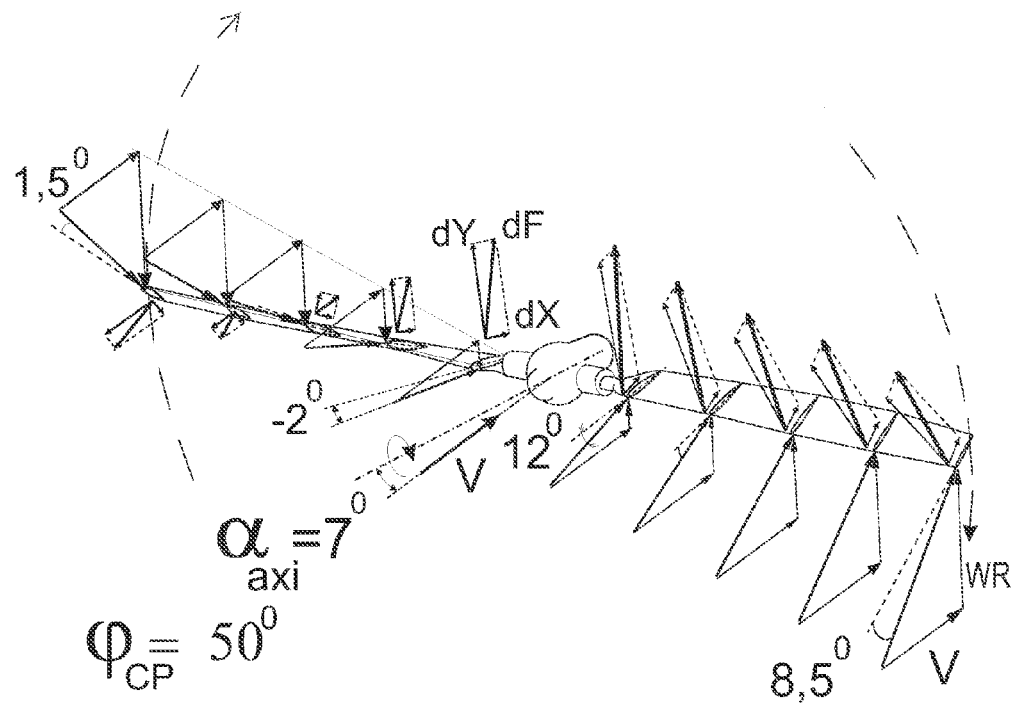
FIG. 7—blades of rotor with axe inclined at 7° to airflow and with speed of airflow equal to the blade tip speed $V_{rel}=1$.
Figure 8:
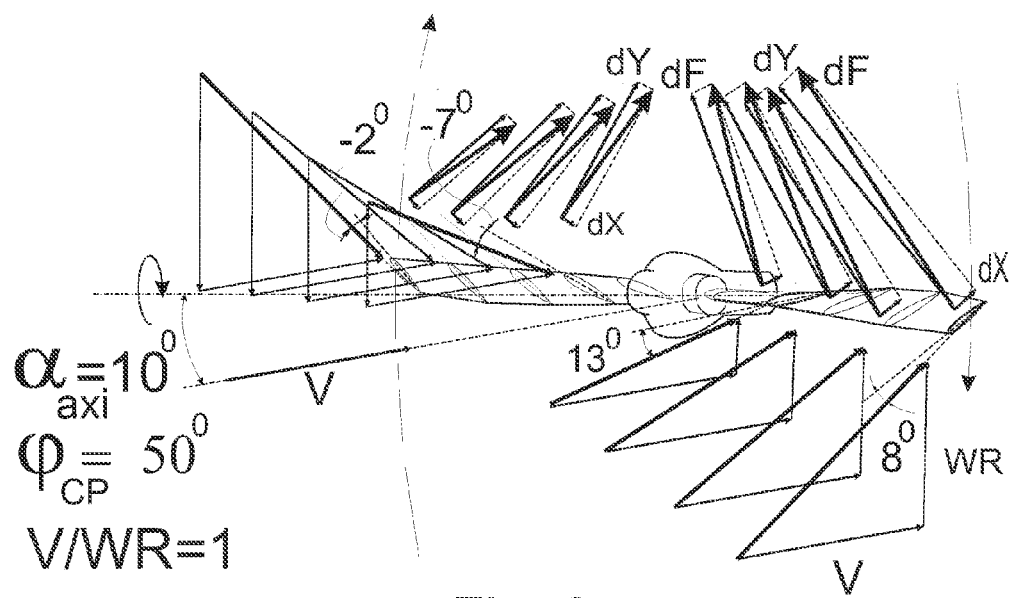
FIG. 8—blades of rotor with axe inclined at 8° to airflow and with speed of airflow equal to the blade tip speed $V_{rel}=1$.

Upon achieving $V_{oTH}=1$ and creating the force with a value required for maintaining the weight of an aircraft in flight, the value of thrust of propellers is too high. Its decrease may be achieved only when reducing the blades setting angle. At axis angles to the airflow ranging from 7° to 10° this will lead to creation of negative angles of attack at a portion of the propeller. While at $V_{oTH}=1$ on the propeller during revolution from vertical to horizontal position of the blade there is a higher increase of angles of attack closer to the propeller axis with respect to angles on periphery of the propeller at $\phi_{oIII}=48°$, the angles of collective pitch are specified between the cross-section on the end of the blade and the plane of rotation, $\alpha_{OCH}=5°$ over 5°, $\phi_{oIII}=50°$, $\alpha_{ocu}=7°$ over 4.5° because when reducing the radius the peripheral speed of rotation falls (FIGS. 7, 8).

According to the offered method for increasing the force, normal to the axis, with respect to the thrust of the propeller for realizing the flight upon achieving the speed of the aircraft flight, not lower than 50 m/s, the propeller rotation is slowed down and the relative speed of the propeller is established within the limits:

$$V_{OTH} = \frac{V_{ocu}}{U} = 1,2 \div 3;$$

At the same time angles $\phi_{oIII}$ are increased process as increasing the relative speed of propeller, providing angles of attack of blades not resulting to shock stall of the airflow, with a possibility of increasing the force normal to propeller axes, while reducing the peripheral speed of propellers.

While increasing the relative speed of the propeller the forces created on the blade, deviate to a plane of propeller thus resulting in increase of force, normal to the propeller axis, in the direction of deflection of axis in the direction of air flow.

Figure 10:
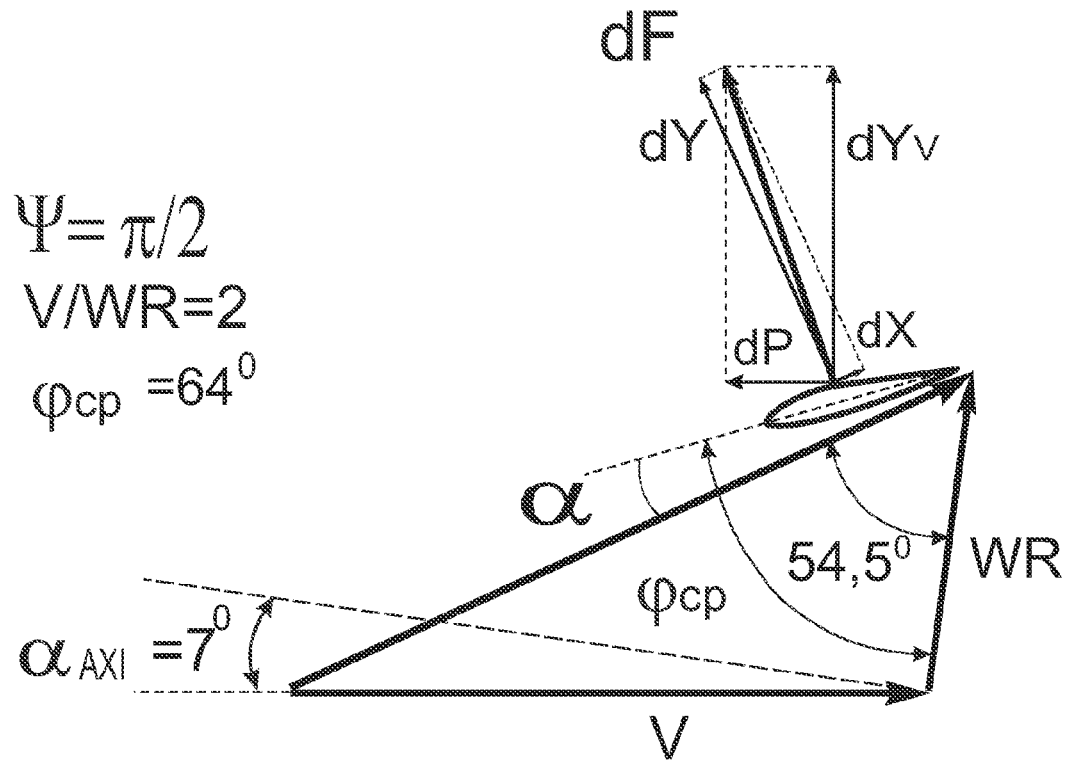
FIG. 10—vector diagram for blade element with speed of airflow two times more than blade tip speed $V_{rel}=2$.

Thus if $V_{oTH}=2$ in the position of the blade $\Psi=90°$ the projection of force dF, created by the blade element located on the end of the blade, on the vertical plane $dY_v$ considerably exceeds the projection dP on the direction of thrust (FIG. 10).

Thus, for realizing the flight on propellers using the offered method the $V_{oTH}>1.2$ is used. Such an increase of relative speed allows to increase the force, normal to the propeller axes, and to reach the ratio of lift required for flight and thrust of propellers, including the case of absence of negative angles of attack on blades during their revolution.

At the same time, for realizing the flight on propellers using the offered method the $V_{oTH}<3$ is used as at $V_{oTH}>3$, the value of lift, normal to the propeller axis, continues to increase when increasing the relative speed of the propeller, but creating the thrust becomes so inefficient, that the propeller cannot be used as a propulsor.

Figure 11:
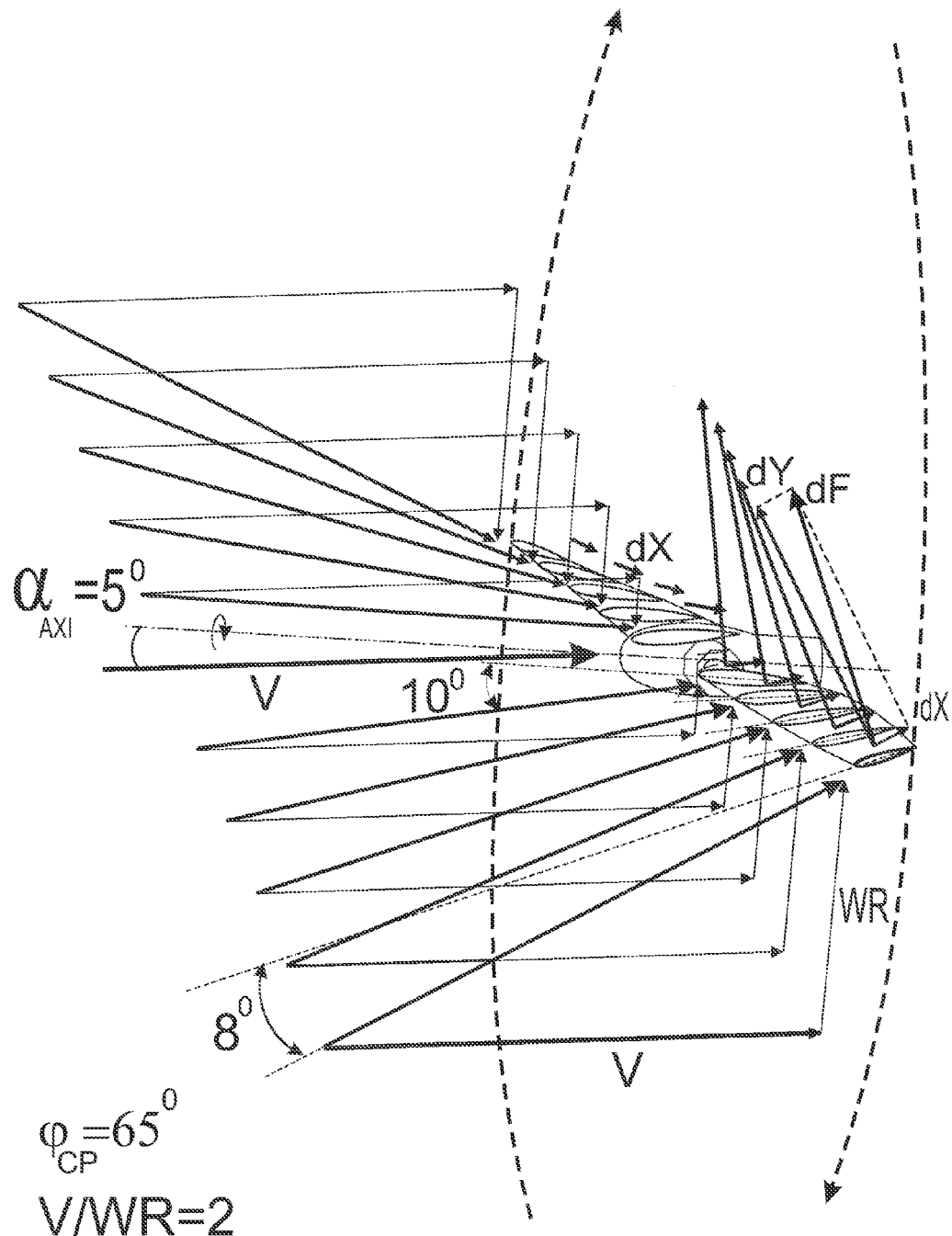
FIG. 11—flow around blade of rotor with axe inclined at 5° to airflow and with speed of airflow two times more than blade tip speed $V_{rel}=2$. View #1.

At $V_{omH}=2$ setting the axis at an angle $\alpha_{ocu}=5°$ the difference between the angles at the propeller axis and the angles at the end of the blade is no more than 2° (FIG. 11).

The minimal speed of use of the offered method of flight is 50 m/s: it is close to half of maximal speed that may be reached by a helicopter. Creating a lift and thrust in flight at such speeds may be effectively carried out by a method used by helicopters and other propeller-driven vertical take-off aircrafts that are using vertical position of propeller axes at high rotational speed for creating thrust, directed along the propeller axis.

Thus, the value of the propeller lift in process of slowing down the peripheral speed may be increased, that will allow flying in a wide range of speeds, including enough low speeds of flight, starting from 50 m/s.

In absence of cyclic variation of blade setting angle the angle of the axis to the air flow direction, providing creation of force, normal to the axis of propellers, and of lift according to the offered method, ranges from 2° to 8° as at angles of axis to the air flow equal to zero and close to them there is no variation of angles of attack during the revolution, and at angles of axis over 8°, there may be a shock stall on a part of the propeller, thus sharply bringing down the forces working on the propeller blade.

In flight following to the offered method various operating modes of the propeller may be used depending on the angle of axis to the air flow:

the mode of strictly axial air flow on propellers provides improvement of air flow on propellers and allows effective lift and thrust for flight;

use of propellers with an axis under a wide angle to the air flow is necessary for maneuvering using wide angles of axis to the air flow, including the transition from vertical position of axes to the position of axes to the air flow, as well as for providing maximal increase of propeller lift for maneuvering with overloads.

According to the offered method when using cyclic variation of blade setting angle for creating the lift the position of axis strictly to the air flow and wide angles of propeller axis to the air flow may be used as follows.

The axes of both counter-rotating propellers are set in one direction under angles to the air flow in the range:

$$\alpha_{ocн} = 0° \div 45°.$$

Thus there is a possibility of cyclic variation of blade setting angle with creating of maximal difference of blade setting angle of the propeller on first half-turn in sector between 60° and 120° with respect to blade setting angles in sector between 240° and 300° on second half-turn of each propeller counting by rotation from azimuthal positions directed from the center by radius to one set direction. At $\alpha_{ocн} > 2°$, propeller axes are pitched in set direction, creating herewith maximum pitch angles during blade turn on one propeller on the side opposite to the sector, on which maximum pitch angles are created on the counter-rotating propeller. Similarly to mentioned above, minimum pitch angles are ensured during blade turn on one propeller on the side opposite to the sector, on which minimum pitch angles are created on the counter-rotating propeller. Thus it is possible to ensure absence of shock stall; equalize the counter-rotating propellers moment; create forces, normal to the propellers axes in set direction and control of its values, variation of the difference between maximal and minimal pitch angles during blade turn on each propeller; control of direction and value of the force, created by propellers as well as creation of lifting force and thrust or deceleration force with possibility of cruise or maneuver flight.

Figure 19:
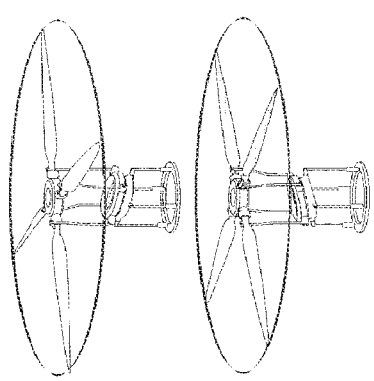
FIG. 19—scheme of wobble plate revolution with cyclic variation of blade's pitch angles during revolution of contra-rotating rotors for producing side forces on rotors.

The feature of used variation of blade setting angle during the blades revolution is that when making the blade setting angle wider with respect to opposite positions of the blade, according to the above method there is an increase in setting angles in opposite positions of counter-rotating propeller blades, reducing the setting angles is being done in similarly. Thus the moments from counter-rotating propellers compensate each other when creating the force working normally to propeller axes. When using on counter-rotating propellers with cyclic variation of blade setting angle according to the offered method by means of take plate, the wobble plate on counter-rotating propellers is turning from side to side (FIG. 19).

The offered method is used depending on various angles of the axis to the air flow, as well as for getting various ratio of thrust and lift on propellers.

Figure 14:
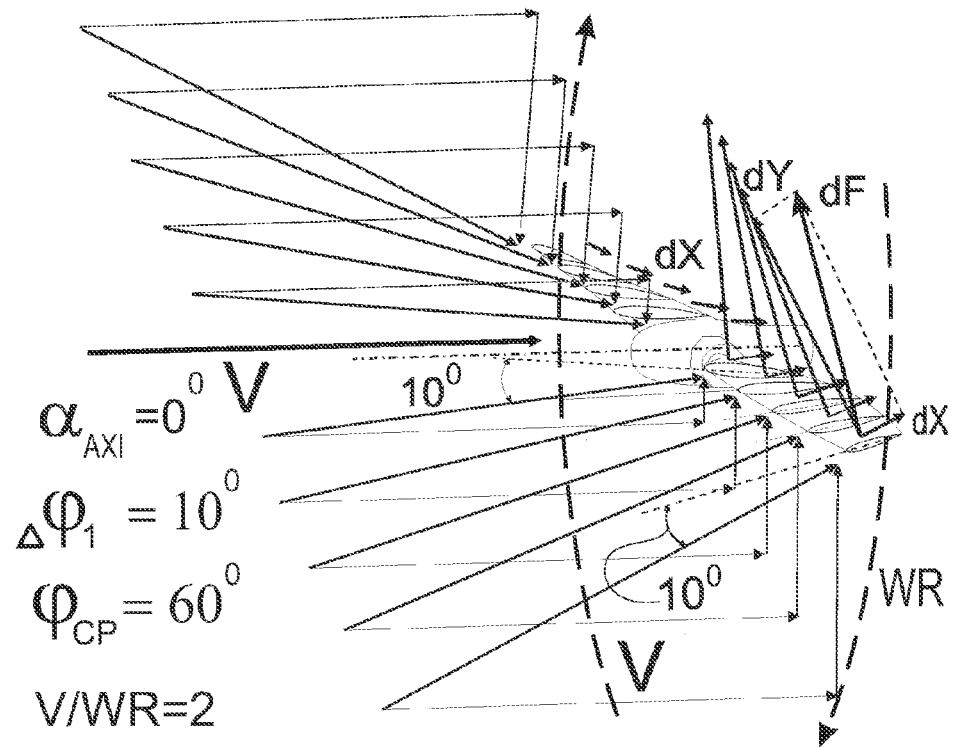
FIG. 14—flow around rotor in axial flow mode with $V_{rel}=2$ an cyclic pitch angle variation on 10°.

When setting the axes of propellers at an angle to the air flow in the range of 0° to 2°, the blade setting angles are varied cyclically with achieving the widest blade setting angles during a revolution on sector of rotation in first half of revolution, between 60° and 120° in from the set direction, with creating, besides the thrust, a force normal to axes of propellers in the set direction, and increasing its value when increasing the greatest the blade setting angles during the revolution for a value no more than the value of angles which result in flow shock stalls (FIG. 14, 16).

Figure 15:
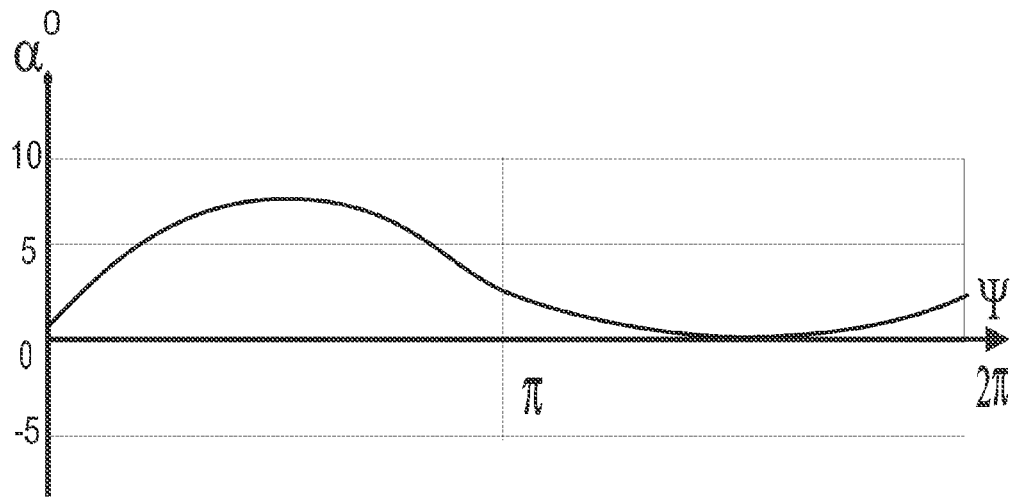
FIG. 15—diagram of blade's pitch angles cyclic variation during revolution in axial flow mode.
Figure 16:
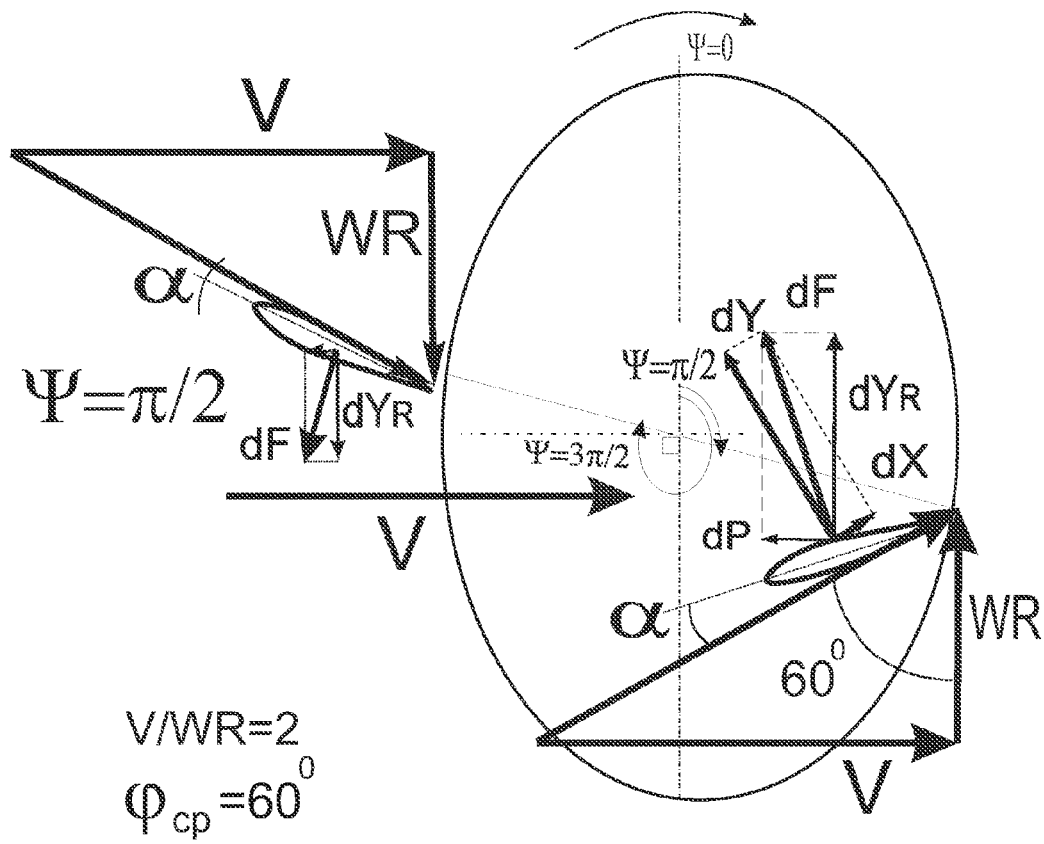
FIG. 16—vector diagrams for blade element with cyclic pitch angle variation during revolution.

The schedule describing the alteration of angles of attack during a revolution as a result of cyclic alteration of setting angles of blades in the axial mode on each air propeller is shown in FIG. 15, while vector diagrams of rotation of section of the blade located on the end of the blade at $\Psi=90°$ and $\Psi=270°$ in FIG. 16.

Figure 17:
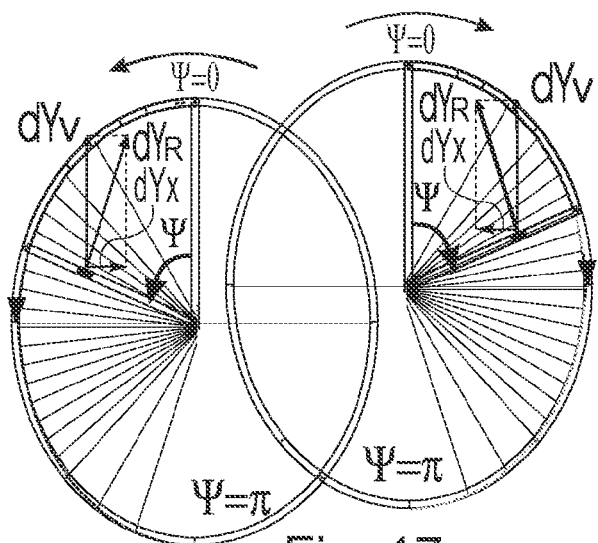
FIG. 17—vector force diagram in rotor plane for contra-rotating rotors blades.
Figure 18:
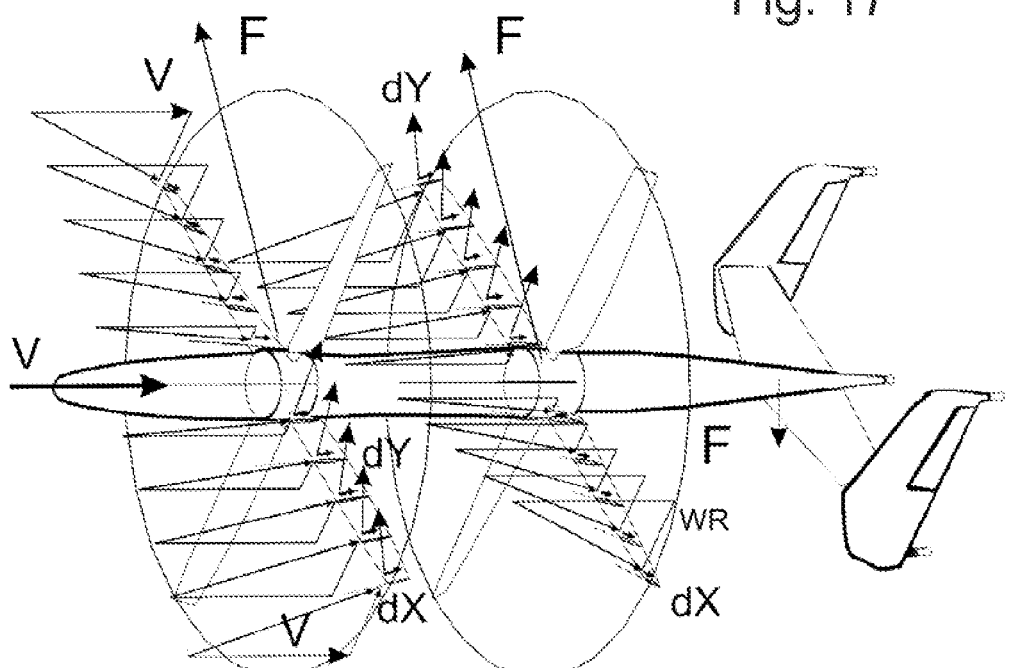
FIG. 18—general scheme of flight producing lift and thrust forces by contra-rotating rotors in axial flow with cyclic variation of pitch angle during revolution.

The forces, created by two counter-rotating propellers in flight, are shown on the vector stress diagram in the plane of propellers (FIG. 17). The circuit diagram of flight on propellers when creating of lift and thrust on counter-rotating propellers in axial air flow using cyclic alteration of setting angles of blades during their revolution explains creation of forces and an equilibration of the moments in flight on counter-rotating propellers following the offered method (FIG. 18).

It is to note, that use of alteration of setting angles during the revolution allows to alter the angles of attack of the blade to achieve the same angle on the root and on the tip of the blade.

Use of strictly axial flow of the propeller with practically full absence of slanting blasting of the propeller with cyclic alteration of setting angles according to the offered method allows to effectively create lift and thrust for flight propellers.

The top limit of the specified range is defined under the assumption that at angles of an axis lower than 2° without use of cyclic alteration of setting angles it is impossible to create an enough high lift normal to the axe.

In the range of angles of axis to the air flow $\alpha_{ocн} = 2° \div 8°$ the lift is created both with use of increasing the setting angles of blades, and without use of alteration of setting angles of blades.

The bottom limit of the specified range is defined under the assumption that at angles of an axis over 2° without use of cyclic alteration of setting angles it is possible to create an enough high lift normal to the axe.

The top limit is defined under the assumption that at angles of an axis over 8° with use of cyclic alteration of setting angles $\phi_{oIII}$ on the rotation sector between 60° and 120° with respect of direction of inclination of the axis to the air flow, the angles of attack at the blade root will be increased as compared to angles of attack arising at an axial flow $\alpha_{n0} = 5° \div 10°$ at angles over 8° and may exceed the angles resulting to air flow shock stalls.

For flight at angles verging to $\alpha_{ocн}=8°$, when rotating on the sector of rotation laying between 60° and 120° with respect to the set direction, the angles of attack of blades are increased to the limit and no additional cyclic alteration of setting angles is required, thus it is possible to create forces in absence of cyclic alteration of angles.

When creating forces in the specified range of angles, in the absence of cyclic alteration of setting angles of blades for preventing shock stalls on the sector of air propeller where angles of attack are increased, it is necessary to bear in mind that the value of advance ratio of the propeller determined by speeds $V_{ocн}$ and U and by from $\phi_{oIII}$ would influence the angles of attack $\alpha_{n0}$ on blades in case of axial in-flight flow of the propeller. If setting the air propeller under an angle $\alpha_{ocн}$ the maximal value of angles of attack that may be achieved at the blade root, will be increased with respect to angles at an axial flow of the propeller in positions of the blades laying in first half-turn along the propeller rotation from the set direction of deflection of the propeller axis at an angle not exceeding that of the $\alpha_{ocн}$.

To effectively create the thrust and lift on propellers with inclination of axis to the air flow the propeller axes are set of under an angle in the range $\alpha_{ocн}=2°\div8°$, in absence of cyclic alteration of setting angles of blades.

When setting the propeller axis at an angle to the air flow in the range of 2° to 8°, and creating the force, normal to axes in the set direction, for additional increase of this force there is a cyclic alteration of setting angles for increase the setting angles, on the sector of rotation between 60° and 120° with respect to the set direction, under condition of creation of angles of attack on the blades which are not resulting in shock stalls using the following method.

Figure 20:
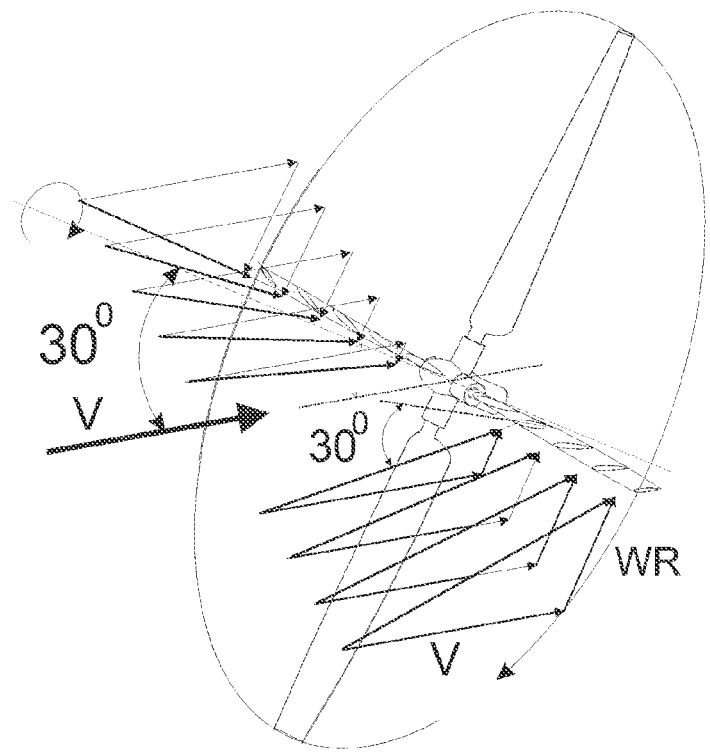
FIG. 20—flow around rotor blade with axe inclined at 30° to airflow direction and with speed of the airflow two times more than blade tip speed $V_{rel}=2$.

When setting the axis at angles over 8°, on the sector of rotation between 60° and 120° with respect to the direction of inclination of the axis to an air flow, the angles of attack at the blade root may exceed the angles resulting to shock stalls. The further increase of angles of the axis to the air flow up to 15° and more, leads to increasing the zone of shock stall on propeller blades and the forces created by the propeller, become pulsing and fall. Increasing the angle of the axis to the air flow may lead to formation of wide angles of attack thus, for example, at a flow of the blade of the propeller having an axis set under an angle 30° to the air flow at $V_{oTH}=2$, the angles of attack over 30° emerge (FIG. 20).

In FIG. 22 *d* the behavior of air inflow angles to the blade close to the root is shown in connection with installation of the propeller axis under various angles to the air flow 8°—Diagram 1; 15°—Diagram 2; 30°—Diagram 3.

For example, in case of setting the propeller axis under an angle 15° to the air flow at constant setting angles during rotation the angles of attack on blades at the blade root will be increased by the angles close to 15° in case of rotation on sector between 60° and 120° with respect to the direction in which the axis is inclined towards the air flow, and will be reduced in opposite sector of rotation. Thus alteration of angles of attack during rotation, caused by setting the propeller, will be close to sine wave (FIG. 22 *d*, Diagram 2).

For preventing shock stalls at axis angles to the air flow over 8°, according to the offered method, when setting the propeller axes under an angle to the air flow in the set direction in the range from 8° to 45° the blades setting angles are being cyclically altered and reach the least setting angles during a revolution on the sector between 60° and 120° with respect to the set direction, and provide reduction of angles of attack of blades down to values at which there is no shock stall, with an opportunity of creation, besides the thrust, the force, normal to propeller axes in the set direction, and increasing its value while increasing the least setting angles of blades during the revolution.

The bottom border of the range is defined by the fact that when increasing the axis angle $\alpha_{ocн}$ on propellers over 8° there may emerge there can be the wide angles of attack on the blade resulting in shock stalls.

The top limit of the range of angles of the axis to the air flow no higher than 45° is determined, on the assumption of the fact that at $\alpha_{ocн}>45°$ the nonuniformity of speeds grows when rotating the blade in the plane of propeller and the speed of flow on the tips of blades increases when rotating in first half-turn. Therefore the use of the offered method of flight at axis angle to the air flow over 45° is inexpedient. At small speeds of flight with axis angles to the air flow over 45° it is expedient to create the thrust by the propeller mainly along the axis with use of high rotational speed and the high peripheral speed on blades.

Figure 21:
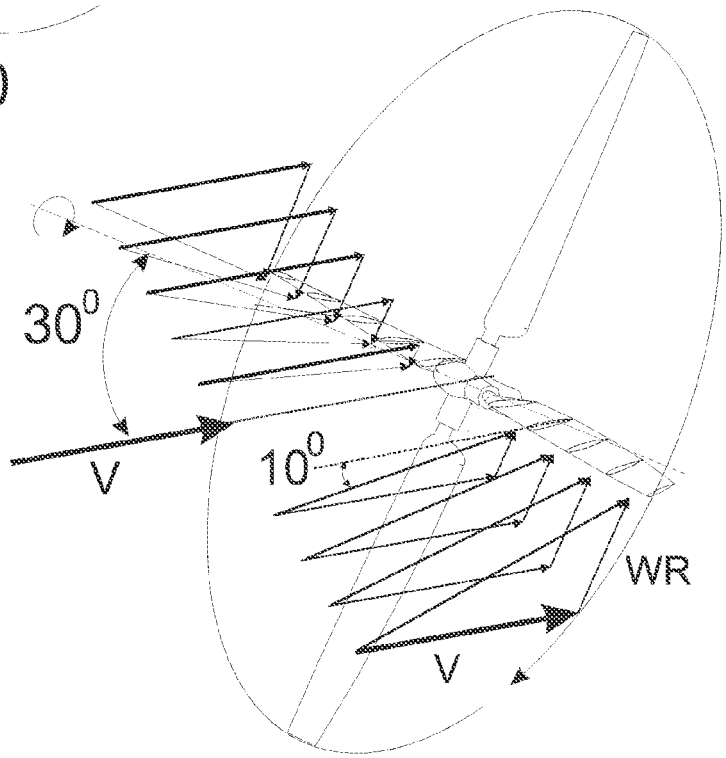
FIG. 21—flow around rotor blade with axe inclined at 30° to airflow direction, with speed of the airflow two times more than blade tip speed $V_{rel}=2$ and with blades pitch angle cyclic variation on 20°.

The offered method may be used when the axis angle to the air flow equals 30° and $V_{oTH}=2$ with use of cyclic alteration of setting angles that will allow to lower the angles of attack of the blade (FIG. 21).

Figure 23:
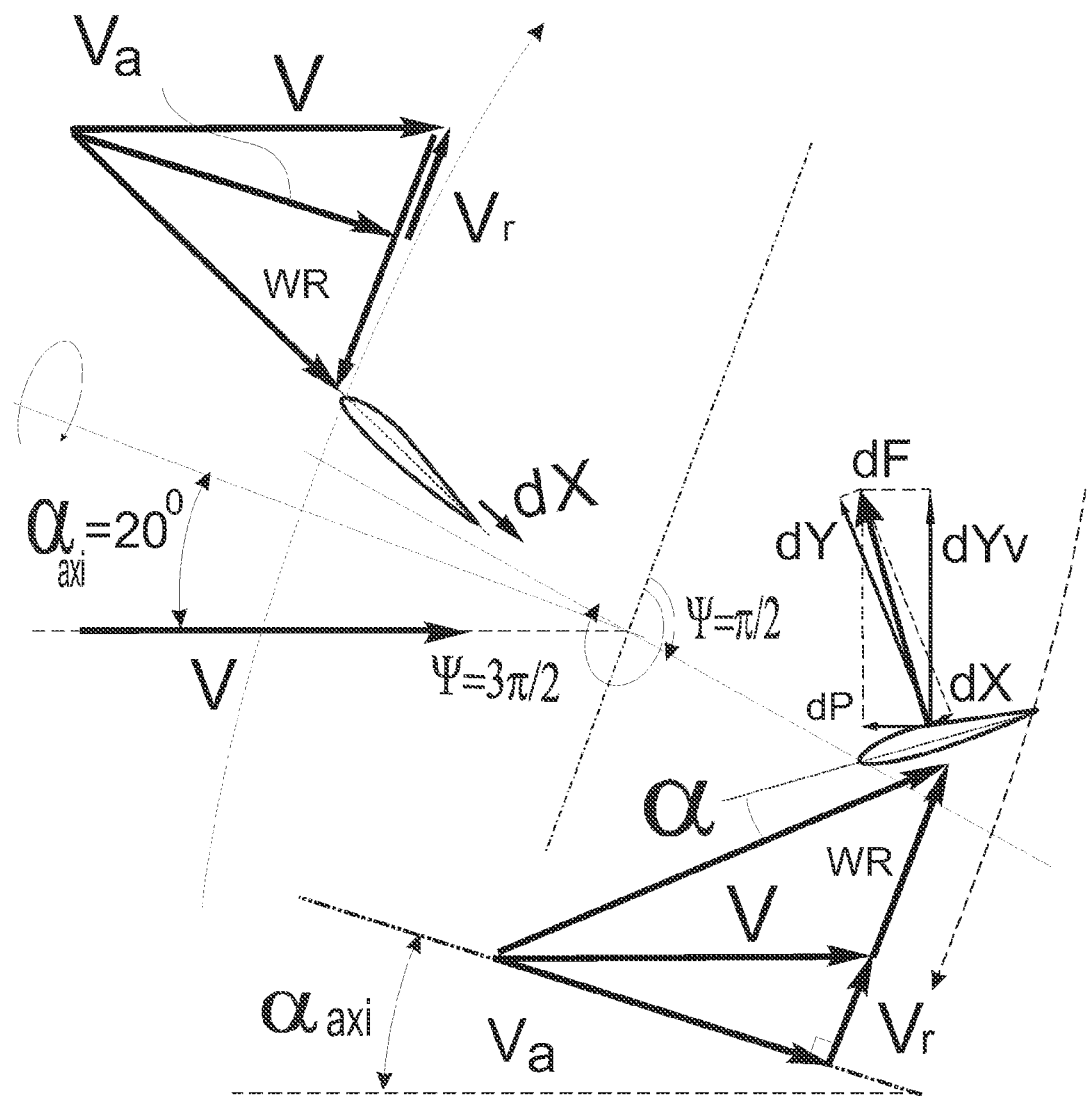
FIG. 23—vector diagrams for blade of rotor with axe inclined at 20° to the airflow with cyclic variation of blade pitch angle on 20° during revolution.

At an axis angle to the air flow 20° with use of cyclic alteration of setting angles according to the offered method, the setting angles are reduced as much as possible by 14° in positions with respect to the set direction where the propeller axis $\Psi=90°$ is inclined and positive angles 6° are created, and in opposite positions the blades at $\Psi=270°$ maximally increase the setting angles from the opposite side by 20° and create angles close to zero (FIG. 23). In FIG. 23 the vector diagrams describing the flow of blade in the opposite half-turn are shown.

Figure 24:
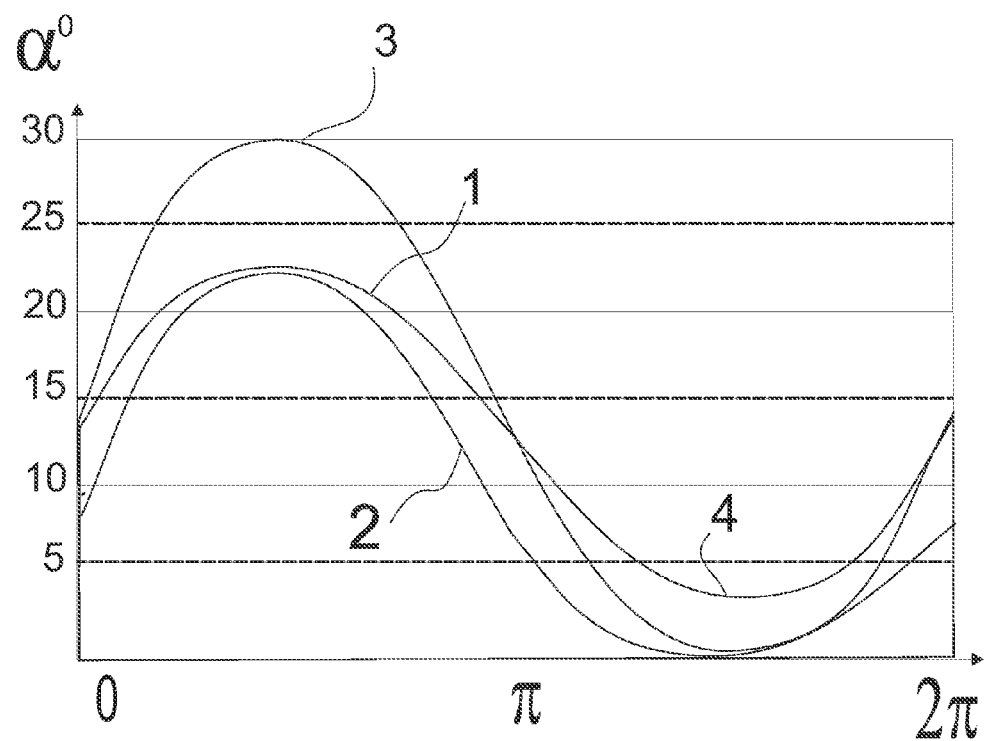
FIG. 24—diagram of rotor blades pitch angle cyclic variation during revolution, produced for compensation of the angle of attack increasing with rotor axe inclined to the airflow at 15°.

The behavior of angle of attack at constant setting angles during the revolution close to the root on blades when rotating in various positions of the propeller blade having the axis located at an angle 15°, it is shown in FIG. 24, Diagram 3, in the first half-turn the angles increase by 15°, and in the second half-turn they decrease by the same value.

Figure 25:
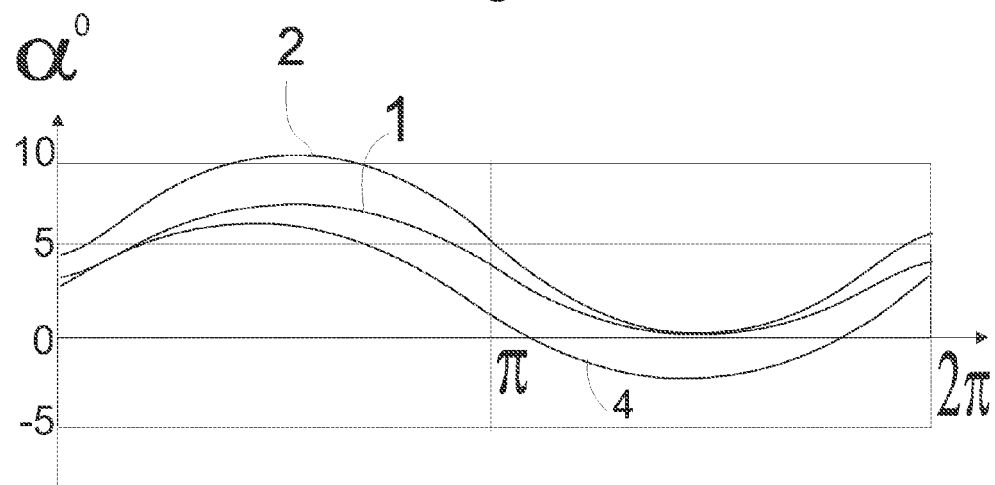
FIG. 25—diagram of angle of attack during revolution as result of pitch angle and glide angle variations with rotor axe inclined to the airflow at 15°.

The increase of angles at propeller blades caused by setting under an angle to the air flow may be compensated by using the sine wave alteration of setting angles. The value of the angle of attack which is compensated by altering the setting angles, is shown in FIG. 24, Diagram 1. As a result of such an alteration of setting angles of blades when rotating in various positions of the propeller blade having the axis located under an angle 15° to the air flow, there is an alteration of angles of attack within the limits of allowable values (FIG. 25, Diagram 1). The value of the angle of attack compensated due to alteration of setting angles in the first half-turn is shown inn FIG. 24, Diagram 2. As a result of such an alteration of blade setting angles in various positions of the blade of the propeller having the axis located at an angle 15° to the air flow, the alteration of angles of the attack, shown in FIG. 25, Diagram 2, is achieved.

Thus for flight the required thrust and force, normal to propeller axes, after achieving the absence of shock stalls on propeller blades using cyclic alteration of blades setting angles are created. According to the offered method, the propeller rotation is slowed down and relative speed of the propeller within the limits: $V_{oTH}=1.2\div3$ is established. Thus the $\phi_{oIII}$ is established equal to angles which at an axial flow of with the speed $V_{oTH}$ provide creation angles of attack $\alpha_{n0}$ on the blade and the axes of propellers to the air flow are set in the range $\alpha_{ocн}=8°\div45°$ in the set direction, and cyclically alter the propeller blades setting angles, reaching in the first half-turn when rotating on the sector of rotation between 60° and 120° with respect to the set direction the least setting angles with possibility of reduction of angles of attack arising on blades in the first half-turn down to angles of not resulting in shock stalls, with increasing the force normal to the propeller axis in the set direction when increasing the least setting angles.

The force created on the propeller forms the force normal to the YR axe and the force directed along the X axis, inclining at various angles to the axis of air flow deviates. As it may be seen from diagrams (FIGS. 22 and, 22 b, 22 c) when increasing the angle of axis the vector of force of the propeller inclines to the inclination of axis and the lift of propeller Yv grows, while the thrust P of the propeller falls. Thus, when using the offered method of creation of force, normal to the axis, and the thrust on the propeller at wide angles of the axis to the air flow without shock stall on propeller blades there is an increase in the lift created by the propeller in process of increase of the axis angle to the air flow, and reduction of propeller thrust. Use of creation of forces in flight at wide angles of the axis to the air flow is necessary for transition from vertical position of axes at low speeds of flight to mainly horizontal position in flight at high speeds using the offered method.

The method allows to fly under wide angles of the axis to the air flow $\alpha_{осн} = 8° \div 45°$ with creating high lift, including the maneuvering or transient modes of flight, and then to proceed to flight under low angles of the axis to the air flow $\alpha_{осн} = 2° \div 8°$ and to switch the propellers to the mode of strictly axial flow at $\alpha_{осн} = 0° \div 2°$ for the most effective creation of lift and thrust using the alteration of setting angles of blades during a revolution and provides the absence of shock stalls when setting the axes strictly along the air flow, as well as under angles to the air flow up to 45° as follows.

The propellers axes are set to the air flow in the range $\alpha_{осн} = 0° \div 45°$, the rotation is slowed down and the peripheral speed of rotation is set so as to provide relative speed of propeller in the range $V_{оТН} = 1.2 \div 3$, the propeller setting angles $\phi_{оШ}$ are provided, being equal to angles, which in case of axial flow of the propeller at a speed Voси, providing angles of attack $\alpha_{л0}$ on the blade. Thus the following inequation is provided:

$$\alpha_{л0} + \alpha_{осн} + \Delta\phi_1 < \alpha_{крит},$$

where $\Delta\phi_1$—value, on which blade pitch angles in first half of revolution are maximally changed, in relation to the collective pitch angles in case of the use of cyclic blade pitch angle variation, $\alpha_{крит}$, is the angle of attack causing the air flow shock stall on the blade, with possibility of cyclic variation of blade setting angles with respect to setting angles of the main pitch, according to:

$$\phi_{усТ} = \phi_{оШ} + \Delta\phi(\phi),$$

where $\phi_{усТ}$—current blade pitch angle;
where $\Delta\phi(\phi)$—value, on which blade pitch angles are changed, relative to the collective pitch angles, in azimuthal rotation of blade at the angle $\phi$
where $\phi$—current angle in azimuth in plane of rotation, formed, if looking to the propeller rotation, between blade and given direction.

with a possibility of creating maximal variation of setting angles having the value $\Delta\phi_1$ in the first half-turn when rotating on the sector of rotation ranging from 60° to 120° if counting from the set direction, with a possibility of creating angles of the attack which are not resulting in shock stalls when providing the inequation:

$$\Delta\phi_1 < \alpha_{крит} - \alpha_{л0} - \alpha_{осн}.$$

while at angles $\alpha_{осн}$, satisfying the inequation:

$$\alpha_{осн} < \alpha_{крит} - \alpha_{л0},$$

the value $\Delta\phi_1 > 0$, and reach the greatest setting angles in the first half-turn of the blade rotation on the sector of rotation ranging from 60° to 120° if counting from the set direction, to achieve the variation $\phi_{усТ}$ with respect to $\phi_{оШ}$ by the value $\Delta\phi_1 = \phi_{усТ} - \phi_{оШ}$, and at angles $\alpha_{осн}$ satisfying the inequation:

$$\alpha_{осн} > \alpha_{крит} - \alpha_{л0}$$

the value $\Delta\phi_1 > 0$, thus the blade setting angles are varying cyclically for reducing the blade setting angles thus creating in the first half-turn on the sector of rotation ranging from 60° to 120° if counting from the set direction, the least blade setting angles, with a possibility of creating the setting angles providing the absence of shock stalls.

The angles of attack $\alpha_{л0}$, achievable at various radiuses of a blade in case of axial flow of propeller, are defined by setting angle of blades $\phi_{оШ}$ taking into account the swirl angles of the blade and air inflow angles and the of inductive downflow to the blade.

When setting the propeller axis at an angle to the air flow $\alpha_{осн}$ there is an increase of angles of attack of the blade being maximum at the root blade having the value not exceeding $\alpha_{осн}$, and the maximal angle of attack achievable during a revolution, will not exceed $(\alpha_{л0} + \alpha_{осн})$. Thus its value should not exceed the value of angle of attack causing the shock stall $\alpha_{крит}$. The value $\alpha_{крит}$ depends on the shape of cross-section, the way of air flow on the blades. In case of cyclic variation of angles connected with oscillations of angles of attack, the value $\alpha_{крит}$ may grow.

When using cyclic variation of blade setting angles according to the offered method, with maximal variation of setting angles having the value size $\Delta\phi_1$ in the first half-turn when rotating on the sector ranging from 60° to 120° if counting from the set direction, a maximum change of angle of attack $\Delta\phi_1$ may be reached. Thus the maximal angle of attack achievable on the blade during a revolution, is defined by the sum of values $\alpha_{л0}$, $\alpha_{осн}$ and $\Delta\phi_1$, i.e. $(\alpha_{л0} + \alpha_{осн} + \Delta\phi_1)$. For preventing the shock stall this angle should not exceed size $\alpha_{крит}$, then at $\alpha_{л0} + \alpha_{осн} > \alpha_{крит}$, the value $\Delta\phi_1 < 0$ becomes negative, that is the setting angles are reduced to the limit at $\Psi = 90°$ for creating angles of attack within the range values allowable for preventing shock stall. At $(\alpha_{л0} + \alpha_{осн}) < \alpha_{крит}$, the $\Delta\phi_1 > 0$ is used for additional increase of angles of attack. If the $\alpha_{осн}$ is sufficient for creating a lift elevating required for flight and if $(\alpha_{л0} + \alpha_{осн}) < \alpha_{крит}$, there may be no cyclic variations of angles of attack.

Use of the offered method allows to prevent the shock stalls when creating forces for flight on propeller for various ranges of setting angles of the axis to the air flow, including the use of cyclic variation of setting angles and allows to create effectively the force, normal to propeller axes, both at strictly axial flow on propellers, and when increasing the angle of axis to the air flow up to 45° in absence of shock stall on the blades.

Thus the lift may vary in a wide range of values with use of variation of relative speed of propeller, when using cyclic variation of blade setting angles for obtaining the lift, both at strictly axial flow on propellers, and when increasing the angle of axis to the air flow up to 45°.

Power consumption for creating thrust may increase essentially or the thrust may drop when decreasing the power required to rotate the propeller in case of flow on blades under negative angles of attack on the second half-turn, if counting from the set direction.

At the same time, creating the negative angles of attack on blades may be used for additional increase of lift due to bringing down the efficiency of thrust, as well as to reducing the thrust down to power reversion, including reduction of power consumption for rotating the propellers down to windmilling.

Increasing the force normal to propeller axis due to drop of thrust may be done using variation of blades setting angles during a revolution when the axis is tilted at an angle to the air flow.

When setting the propeller axis at $\alpha_{ocн} = 15°$ the reduction of blades angles in first half-turn is used, thus providing a compensation of angles of attack up to values preventing shock stall on blades and some increase of setting angles in the second half-turn with values lower than reduction of angles of attack caused by setting the axis under an angle (FIG. 24, Diagram 4). Thus in the second half-turn negative angles of attack on blades (FIG. 25, Diagram 4) are achieved.

Figure 4:
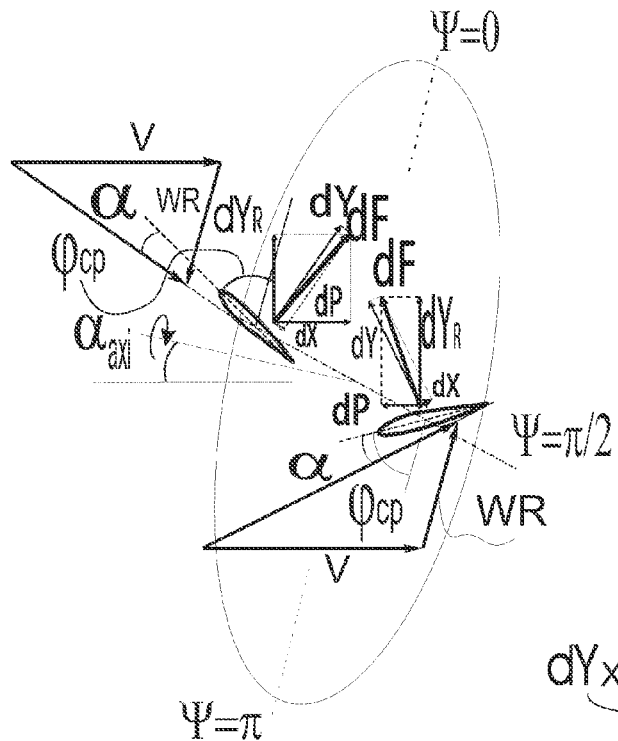
FIG. 4—vector diagrams for blade element of rotor with the axe inclined to the direction of the airflow with reverse zone at third quadrant of revolution.
Figure 5:
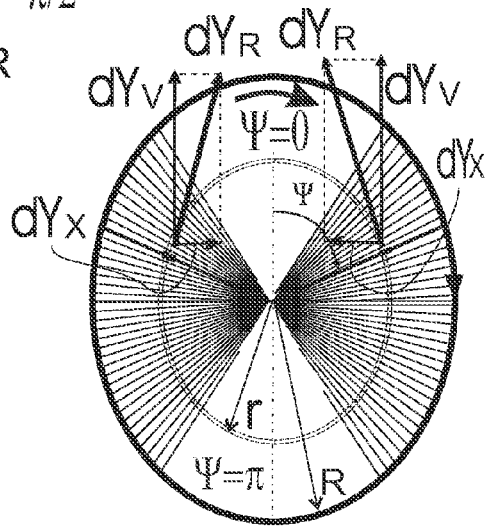
FIG. 5—vector diagram in normal to flight direction plane with reverse sectors for rotor axe inclined to the direction of the airflow.
Figure 6:
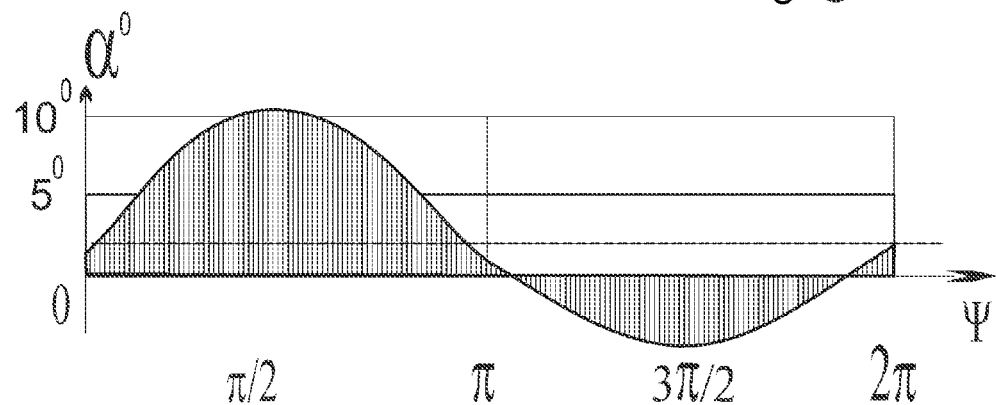
FIG. 6—diagram of blade angle of attack variation during revolution for rotor axe inclined to the direction of the airflow.

Let's consider the use of the offered method on the propeller with constant blade setting angles during a revolution when inclining the axis under an angle to the air flow. In the vector diagram (FIG. 4) the flow on the blade under negative angles of attack at an azimuth $\phi = 240°$ is shown in case of rotation. The portions of blades, being flowed under negative angles of attack, increase the force, normal to the propeller axe, however they create the force slowing down (FIG. 5). The diagram describing alteration the of blades angles of attack during a revolution with an axis located at an angle to the air flow when generating a reversion area is shown in FIG. 6.

For effective creation of thrust on propellers the absence of areas having negative angles of attack of blades is provided. At $V_{oTH}=2$, $\phi_{oIII}=65°$ the non-negative angles of attack are provided, due to angles of collective pitch providing for enough high angles of attack on propeller blades (FIG. 11).

In absence of cyclic alteration of blades setting angles in the second half-turn if counting from the set direction the setting angles $\phi_{oIII}$ of air propeller are provided, being equal to angles that in case of air propeller axis directed strictly along the air flow, moving at a speed Voc и, provide angles of attack $\alpha_{\pi 0}$.

The equation $\phi_{ycT}=\phi_{oIII}$ is provided with creating the angles of attack over zero, when rotating the blade if counting from the set direction on the second half-turn. Thus the following inequation is observed:

$\alpha_{ocн} < \alpha_{\pi 0}$, to increase the blade setting angles with main pitch $\phi_{oIII}$ for maintaining the higher above ratio and creating non-negative angles of attack in the second half-turn when rotating on the sector ranging from 240° to 300°, with a possibility of creating of: the force normal to the propeller axis in given direction; the thrust.

Figure 12:
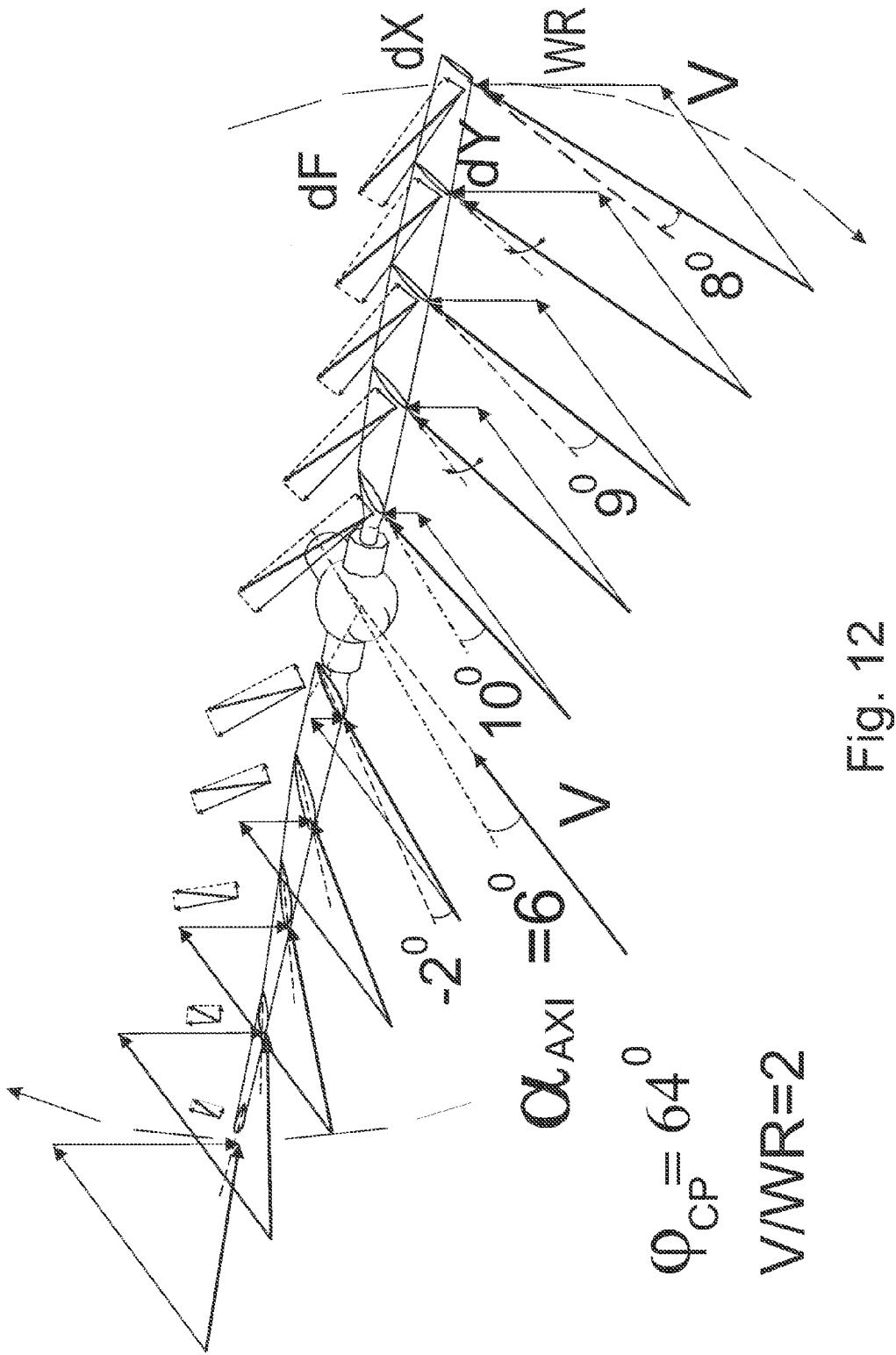
FIG. 12—flow around blade of rotor with axe inclined at 5° to airflow and with speed of airflow two times more than blade tip speed $V_{rel}=2$. View #2.

When inclining the axis in the set direction in process of increasing the $\alpha_{ocн}$ in the second half-turn on the sector of rotation ranging from 240° to 300°, there is a reduction of angles of attack of blades at rotation near $\phi=240°$. When increasing $\alpha_{ocн}$ of the propeller over $\alpha_{\pi 0}$ near $\phi=240°$ the negative angles of attack of blades may occur. FIG. 12 shows the occurrence of negative angles of attack at a blade root at blade positions close to 270° if $\alpha_{ocн}=6°$ and и $\phi_{oIII}=64°$, providing $\alpha_{\pi 0}=4°$ in case of axial flow.

On air propellers at absence of cyclic alteration of blades setting angles in the second half-turn the force normal to axes of the propeller is created when bringing down the thrust or a reversing the propeller with creating negative angles of attack on blades when rotating in the second half-turn, the following inequation is observed $\alpha_{ocн} > \alpha_{\pi 0}$, with a possibility of creating in the second half-turn the negative angles of attack, with a possibility of increasing the force, normal to the axis of propeller in the set direction, at simultaneous drop of propeller thrust down to creating the slowing down force.

When rotating of the blade if counting from the set direction on the second half-turn the following equation is reached:

$\phi_{ycT}=\phi_{oIII}$, the $\phi_{oIII}$ is reached, equal to angles which in case of axial flow on propeller provide the angles of attack equal to $\alpha_{\pi 0}$, when rotating of the blade if counting from the set direction on the second half-turn the following while observing the inequation:

$\alpha_{ocн} > \alpha_{\pi 0}$, with a possibility of increasing the force, normal to the axis of propeller in the set direction, in case of simultaneous drop of thrust of the propeller.

Moreover when increasing the negative angles of attack in the second half-turn there is an increase of force, normal to the axis of propeller in the set direction, with simultaneous drop of thrust of air propeller with possibility of reversing the propeller, when reducing $\phi_{oIII}$ down to values, when $\alpha_{\pi 0} < 0$, with a possibility of windmilling of the propeller. Using such a mode of flight allows to create a lift when reducing altitude in case of engine failure.

For realizing effective flight using the offered method it is necessary to define the conditions of use of the given method, providing the absence of sectors with negative angles of attack due to cyclic alteration of setting angles in the second half-turn.

The axes of propellers are set at an angle to the air flow. The $\phi_{oIII}$ is set equal to angles which at an axial flow on the propeller provide creating angles of attack $\alpha_{\pi 0}$. The blades setting angles of propeller are cyclically altered and when rotating on the sector ranging from 240° to 300° counting from the set direction they reach maximal value of alteration in the second half-turn $\phi_{ycT}$ with respect to $\phi_{oIII}$ as follows:

$\Delta\phi_2 > (\alpha_{ocн} - \alpha_{\pi 0})$.

where $\Delta\phi_2$—value, on which blade pitch angles are maximally offset, in second half of revolution, in relation to the collective pitch angles;

with a possibility of increasing the force, normal to the axis of propeller in the set direction and creating thrust on the propeller.

Thus, when using the angles $\alpha_{ocн}$, meeting the inequation $\alpha_{ocн} < \alpha_{\pi 0}$, the blades setting angles are maximally reduced at a value size $\Delta\phi_2 < 0$ with creating the least setting angles in the second half-turn when rotating the sector ranging from 240° to 300°, with a possibility, when creating the thrust, an increase of force, normal to axes of propellers in the set direction, in process of reduction of setting angles in the second half-turn of the blade in the range of setting angles providing a flow of blades under non-negative angles of attack.

At angles $\alpha_{ocн}$, satisfying the inequation $\alpha_{ocн} > \alpha_{\pi 0}$, the blades setting angles are increased in the second half-turn when rotating on the sector ranging from 240° to 300°, at a value $\Delta\phi_2 > 0$, the non-negative angles of attack of blades in the second half-turn are created with a possibility of reducing the angles of attack of blades in the range of non-negative values, and increasing the force, normal to the axis of propeller in the set direction when increasing the value ($\alpha_{осн} - \Delta\phi_2$) together with creating a thrust on the propeller.

Use of reduction of angles of attack in the second half-turn in the range of angles over zero allows to lower the value of forces created on blades in the second half-turn that allows to increase the lift value.

Using the cyclic variation of blades setting angles in the second half-turn of rotation from the set direction with inclining the axis to air flow allows to additionally increase the force normal the propeller axes due to drop of thrust down to power reversion of the propeller. The maximal reduction of setting angles in the second half-turn, with respect to angles of the main pitch when rotating on the sector of rotation ranging from 240° to 300° down to:

$$\phi_{ycT} = \phi_{oIII} + \Delta\phi_2, \text{ at } \Delta\phi_2 > 0 \text{ is reached}$$

with that blades pitch angles are cyclically varied in second half of revolution, reading rotation-wise from given direction maximally on $\Delta\phi_2$ while ensuring inequation:

$$\Delta\phi_2 < \alpha_{осн} - \alpha_{л0}$$

with a possibility of increasing the force, normal to the axis of propeller in the set direction, in case of simultaneous drop of thrust of the propeller.

Thus the setting angles of blades cyclically vary in the second half-turn, on rotation from the set direction, to a maximum on $\Delta\phi_2$ while observing the inequation $\Delta\phi_2 < \alpha_{осн} - \alpha_{л0}$, with a possibility of creating negative angles of attack on blades in the second half-turn. At angles $\alpha_{осн}$, satisfying the inequation $\alpha_{осн} < \alpha_{л0}$ the value $\Delta\phi_2 < 0$. At angles $\alpha_{осн}$ satisfying the inequation $\alpha_{осн} > \alpha_{л0}$ the value $\Delta\phi_2$ may be both positive or negative in the range providing for negative angles of attack in the second half-turn of revolution. When increasing the value ($\alpha_{осн} - \Delta\phi_2$) the growth of negative angles of attack mainly on the sector ranging from 240° to 300°, and increase of force, normal to the axis in the set direction is obtained, with a drop of thrust, down to creating a deceleration force, particularly with creation of torque by propeller, in direction of propeller rotation and with propeller windmilling with creation on a rotation sector ranging from 60° to 120° angles of attack, having absolute values less than negative angles of attack created by rotation on sector ranging from 240° to 300°. Thus, upon achieving by negative angles of attack of blades of the high absolute values with respect to positive angles of attack of blades in the first half-turn of the blade, windmilling on propellers is achieved.

Use of the offered method for increasing the lift at windmilling counter-rotating propellers with axes under a wider angle to the air flow up to 45° for reducing altitude is possible in case of engine failure.

Figure 33:
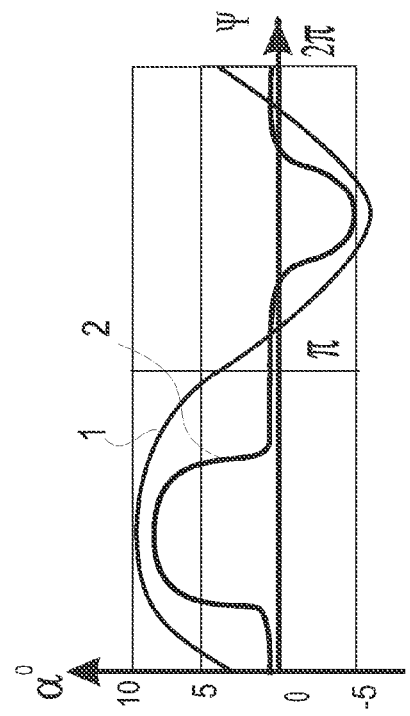
FIG. 33—diagram of blades angle of attack during revolution if blades tilting on negative and positive angles of attack during revolution while producing thrust force by rotors.
Figure 32:
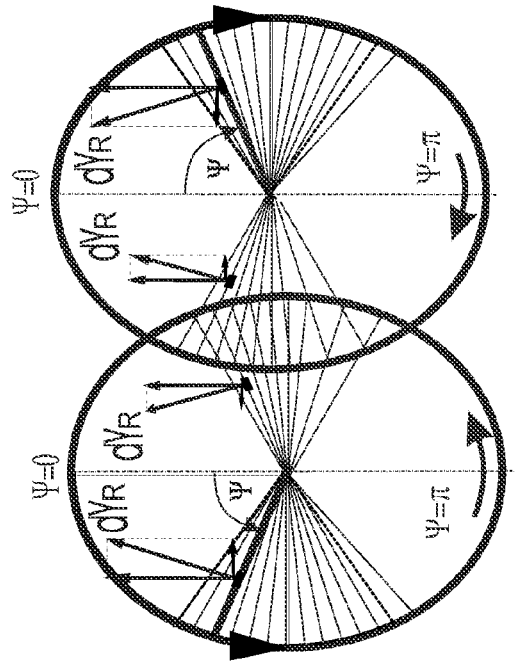
FIG. 32—vector force diagram in rotor's planes for blades tilting on negative and positive angles of attack during revolution while producing thrust force by rotors.

It is possible to use this method for additional increase of lift due to bringing down the efficiency of creation of thrust in case of axial flow on propellers. Sectors where aerodynamic forces on counter-rotating propellers are created are shown in FIG. 32; the diagram describing variation of angles of attack when using a wobble plate is shown in FIG. 33, Diagram 1.

Figure 36:
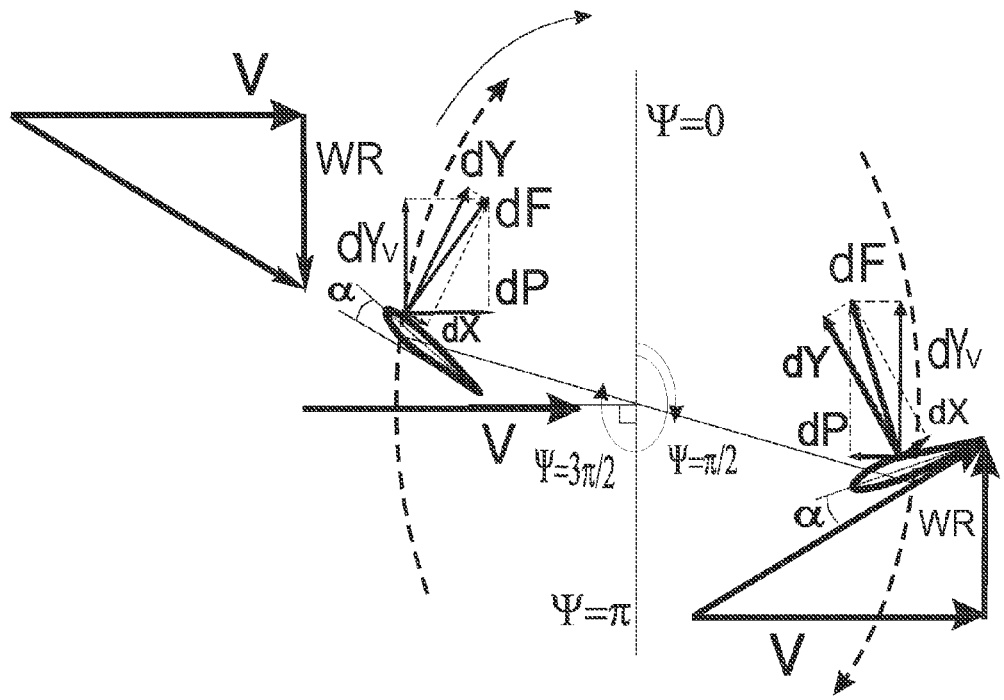
FIG. 36—vector force diagram for blade element if using blade tilting on positive and negative angles of attack.

The forces arising on the propeller in an axial air flow when varying the propeller blade angles of attack from positive in the first half-turn to negative in the opposite position of rotation, are shown on vector diagrams of speed and force (FIG. 36).

Figure 35:
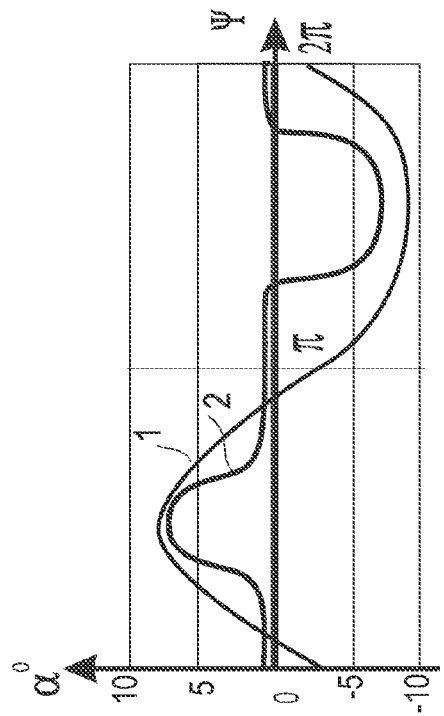
FIG. 35—diagram of the blades angles of attack during revolution if using blades tilting on positive and negative angles of attack during revolution with windmilling during rotor reverse.
Figure 34:
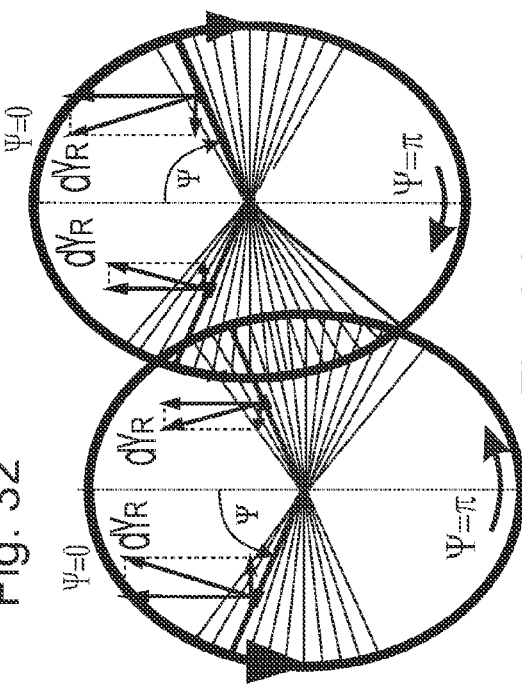
FIG. 34—vector force diagrams in rotor plane if blades tilting on positive and negative angles of attack during revolution with windmilling during rotor reverse.

Moreover creating in the second half-turn of revolution of angles of attack being lower than zero and having high absolute values as compared to positive angles of attack in the first half-turn leads to windmilling of the propeller in a mode of a wind-driven generator (sectors where create aerodynamic forces on counter-rotating propellers are created are shown in FIG. 34; the diagram describing such a variation of angles of attack during the revolution with use of wobble plate for varying the angles of blades is shown in FIG. 35, Diagram 1). In FIG. 7 origination of negative angles of attack $\alpha_{осн} = 2°$ in the second half-turn at the blade root is shown.

When creating a cyclic variation of angles the blade settings may use sine wave variation of setting angles during rotation in the first half-turn if counting from rotation in the set direction, according to equation:

$$\phi_{ycT} = \phi_{oIII} + \Delta\phi_1 \sin(\phi)$$

and when creating on blades a cyclic variation of angles the blade settings may use sine wave variation of setting angles during rotation in the second half-turn if counting from rotation in the opposite direction, according to equation:

$$\phi_{ycT} = \phi_{oIII} + \Delta\phi_2 \sin(\phi).$$

At $\Delta\phi_1 = -\Delta\phi_2$ a cyclic variation of setting angles during a revolution according to equation $\phi_{ycT} = \phi_{oIII} + \Delta\phi_1 \sin(\phi)$ is provided.

When using a nonsinusoidal variation of blade setting angles, being close to step-like when rotating on sectors where positions of the blade are close to normal to the set direction, the angles of attack of blades are constant and take the maximal value during the revolution therefore, they are most fully using the specified sectors of rotation for creating aerodynamic forces in the set direction and increase the lift of propellers.

Figure 37:
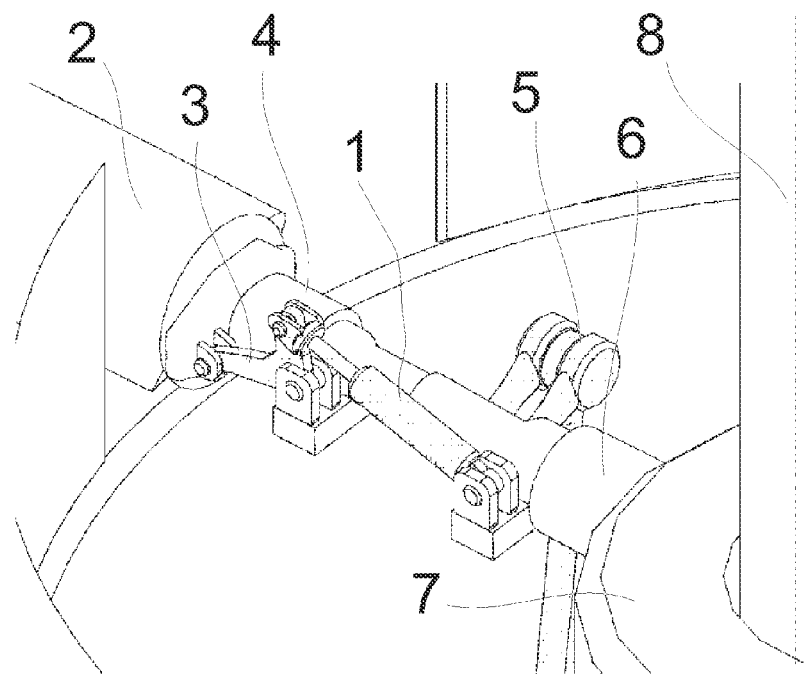
FIG. 37—mechanism for blades angle of attack direct variation during revolution.

Thus it is possible to use, e.g. a mechanism or a drive directly varying the blade setting angles during each revolution depending on an azimuth $\phi$. Such a device may be mounted between the blade fixed to axis with possibility to change the setting angle and a wobble plate or a device for changing the angles of main pitch providing for varying the setting angles during each revolution in the range up to 20° (FIG. 37).

In positions of blades close to normal to the set direction the maximal variation of setting angles with use of nonsinusoidal variation of setting angles is reached.

In the first half-turn on the sector of rotation ranging from 0° and 75°, if counting when rotating from the set direction, the setting angles are increased, they reach the widest setting angles on the first half-turn and prevent reducing the angles below 2°, on the sector beginning between 60° and 75° and terminating between 95° and 120°.

When rotating on the sector ranging from 240° to 300° if counting from the set direction the reduction of angles on blades below zero close to a step-like, which sectors create aerodynamic forces on counter-rotating propellers shown in FIG. 32; the diagram describing the variation of angles of attack is shown in FIG. 33, Diagram 2.

In second half-turn on the sector of rotation ranging from 180° to 245°, if counting from the set direction, the setting angles are reduced, they reach the narrowest setting angles on the second half-turn and increasing the angles over 2°, on the sector beginning between 240° and 255° and terminating between 285° and 300° is prevented.

When creating forces for flight on propellers on the part of revolution where the forces created on blades, do not significantly contribute to create the lift, the blades are set under the angles providing minimal resistance to propeller blades, i.e. under angles of feathering, as a result aerodynamic forces on the propeller are created mainly on sectors where they may be used for obtaining the lift that allows to increase its value as compared to thrust.

Figure 29:
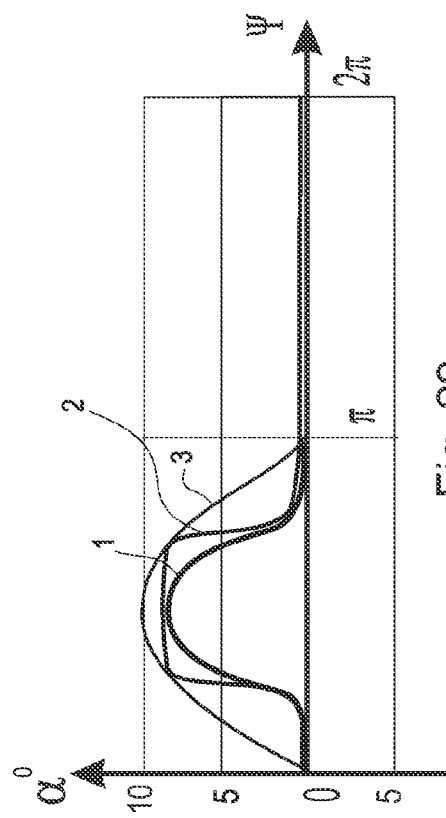
FIG. 29—diagram of blades angles of attack during revolution using 120° sector for producing airforce and streamline blade position in another zone.
Figure 31:
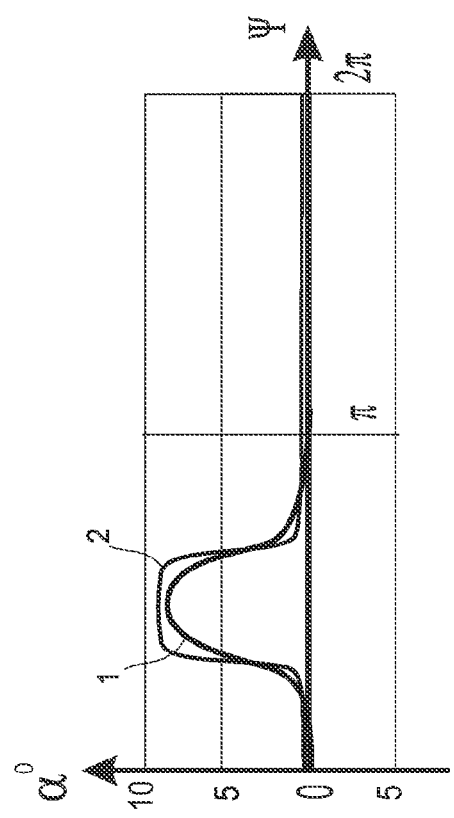
FIG. 31—diagram of blades angle of attack during revolution using 60° sector for producing airforce and streamline blade position in another zone.
Figure 28:
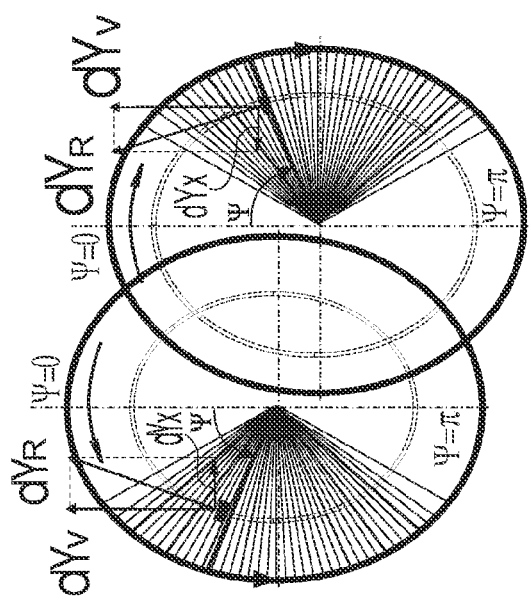
FIG. 28—vector force diagram in contra-rotors planes for the case of producing airforce increasing pitch angle in 120° sector and streamline blade position in another zone.
Figure 30:
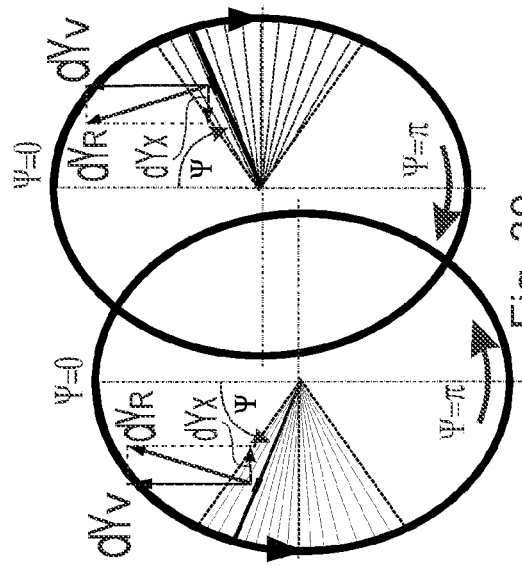
FIG. 30—vector force diagram in contra-rotating rotors planes for the case of increasing blade pitch angles in 60° sector for producing airforce and streamline blade position in another zone.

In FIG. 28 sectors on where aerodynamic forces on counter-rotating propellers are created are shown, the Diagram 3 in FIG. 29 is the diagram describing variation of angles of attack for creating aerodynamic forces on first half-turn of the propeller, and maintaining the minimal angles of attack on second half-turn of the propeller, the Diagram 1 in FIG. 29 is the diagram describing variation of angles of attack for creating aerodynamic forces on the sector that is smaller than a half-turn of propeller, and maintaining the minimal angles of attack on other part of the propeller. For increasing in the lift with respect to the thrust the size of sectors where feathering is carried out, may be increased. In FIG. 30 sectors on counter-rotating propellers and creation of aerodynamic forces on them are shown, the Diagram 1 in FIG. 31 is the diagram describing variation of angles of attack for creating aerodynamic forces on sector not less than 45° and maintaining minimal angles of attack on the other part of propeller.

As due to inclination of the axis in the set direction at an angle $\alpha_{ocн}$ in the first half-turn on the sector of rotation ranging from 60° to 120°, there is a maximal increase of angles of attack of blades when rotating near $\phi=90°$, and in the second half-turn on the sector of rotation ranging from 240° to 300°, there is a maximal reduction of angles of attack of blades when rotating near $\phi=240°$ with respect to angles arising at axial flow of the propeller at a maximum angle $\alpha_{ocн}$, thus for maintaining feathering of blades when rotating on the set sectors of rotation the variation of blade setting angles is used, according to the offered method with maximal reduction of blade setting angles during the revolution near $\phi=90°$ and the maximal increase close near $\phi=240°$ leading to compensation of angles reduction caused by a flow on propeller which axis is set under an angle to the air flow.

Using feathering of the blade at angles of the axis to the air flow up to 45°, including the application of sine wave variation of setting angles according to the offered method, on the most part of revolution and increasing the setting angles basically on sectors of rotation where the blade is close to position normal to the set direction and the projecting aerodynamic forces of the blade to the set direction, is maximal, leads to increasing the value of lift with respect to thrust of propellers. Variation of angles of attack at the blade root at constant setting angles during the revolution at the axis of the propeller set under an angle 15°, is shown in Diagram 3 in FIG. 26, the Diagram 1 in FIG. 26 shows variation of setting angles for feathering on the most part of revolution, Diagram 1 in FIG. 27 shows the achievable increase of angles of attack basically on sectors of rotation where the blade is close to the normal to the set direction.

Figure 26:
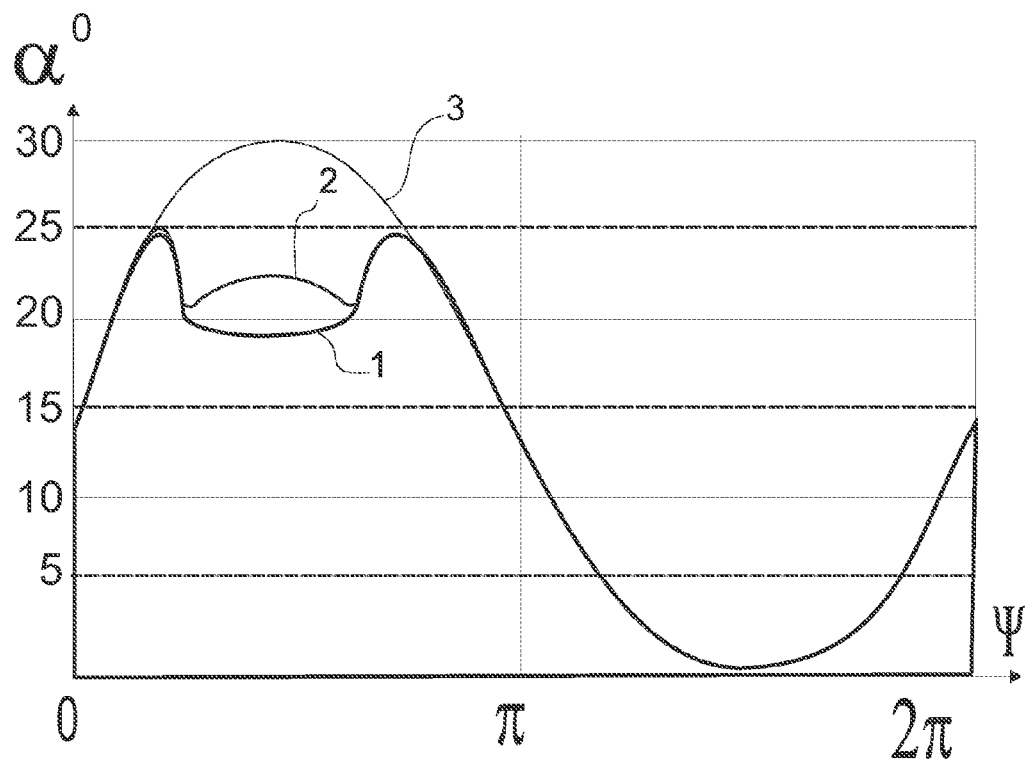
FIG. 26—diagram of step variation of blade pitch angle with rotor axe inclined to the airflow at 15°.
Figure 27:
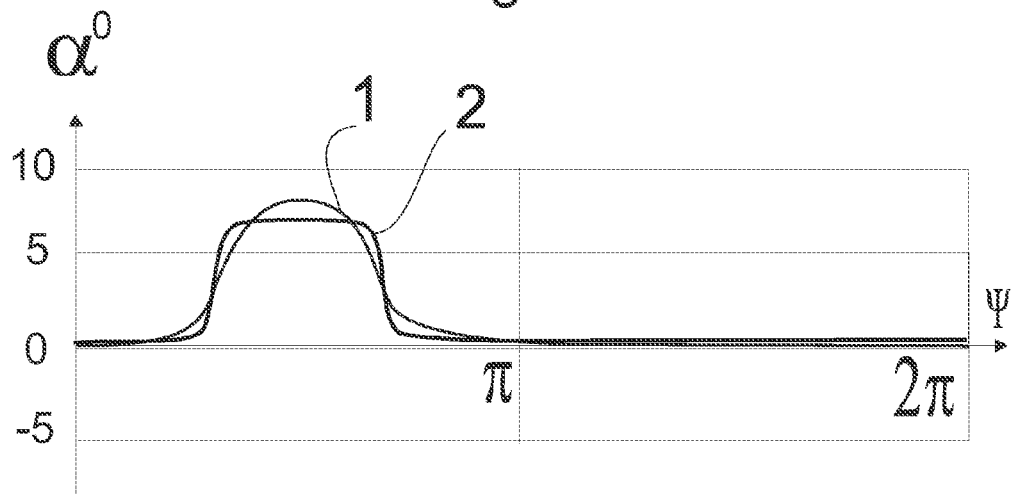
FIG. 27—diagram of the angle of attack during step changing of blade pitch angle during revolution with rotor axe inclined to the airflow at 15°.

The Diagram 1 2 in FIG. 26 shows the variation of setting angles for feathering on the most part of revolution and step-like increase of setting angles on sectors of rotation where the blade is close to the position, normal to the set direction, the Diagram 1, 2 in FIG. 27 shows the achievable variation of angles of attack.

As the variation of angles of attack of the blades, caused by setting the axis under an angle to the air flow, has a sine wave shape, for maintaining the feathered position of blades on such propellers, the sine wave variation of setting angles of blades may be set as follows.

The angles are set:

$$\phi_{oIII}=\phi_{ycT\phi}$$

Where $\phi_{ycT\phi}$—pitch angle, at which propeller feathering in its axial flow is ensured, with possibility of ensuring minimal blades' attack angles.

And in case of rotation of the blade on the sectors ranging from 0° to 45° and from 135° to 360°, if counting from the set direction, the setting angles with respect to angles of the main pitch cyclically vary according to equation:

$$\phi_{ycT}=\phi_{oIII}+\Delta\phi_2 \sin(\phi),$$

moreover the value is set:

$$\Delta\phi_2=\alpha_{ocн}$$

with a possibility of varying the setting angles for maintaining on the blade the angles of feathering in various azimuthal positions during the blade rotation within the limits of specified sectors.

The specified ranges provide the angles close to maximal when rotating the blade near to positions where the value of projection of forces in the set direction the is the greatest within the limits of sector of rotation not less than 20°, and allow for expansion of sector with the maximal angles up to 60°, within the limits of this sector projection of forces to the set direction is close to the value of forces on the blade. Moreover the ranges for feathering are chosen with an interval to the range with maximal angles so as to vary the setting angles of the blade to the angle used in the range when passing from feathering and vice versa.

To control the position of the device in flight, the moments may be created on the propeller in the same way, as, for example, on counter-rotating helicopter propellers using inclination of wobble plates in the same direction one on two or more propellers, as follows.

In addition the blade setting angles are being altered during a revolution, reducing as much as possible the setting angles achieved on each propeller on azimuths, laying in one direction on each propeller, and increasing them as much as possible on opposite azimuths with a possibility of creation of the moment normal to axes of propellers.

For stabilizing the aircraft in flight the empennage is used. For creating moments and controlling the flight attitude the aerodynamic elevator is deflected upwards or downwards. For creating moments and controlling the angular position in traveling direction the aerodynamic rudders are deflect to the right or to the left. For creating moments and controlling the bank angular position the aerodynamic rudders on the left and on the right are deflected accordingly in the opposite directions.

For creating additional lift it is possible to use a wing that may be also for control. It may be done as follows.

The wing is oriented to the incoming air flow under an angle of attack ranging from 0° to 10°. As increasing the angle of attack of the wing the additional supporting lift increases. For controlling the bank of an aircraft in flight the wing ailerons deflection may be used.

For reducing the peripheral speed of rotation of propellers, besides slowing down the rotation of propellers, there may be a reduction of propeller radius due to use of blades of variable length, for example, using telescopic moved blades portions, moving in both directions. The specified relative speed of propeller is reached due to reducing the peripheral speed of propeller, owing to alteration of propellers radius, with a possibility of increasing the relation of force, normal to the axis of propeller, to a thrust force in process of reducing the radius of propellers.

When using the operating modes of propellers having negative angles of attack of blades in the second half-turn, the thrust of the propeller may fall down to power reversion. Such an operating mode of propeller is accompanied with reduction of required moment for rotating the propeller down to windmilling when power reversion. In this case at least, one additional propulsor for creating thrust is used and the flight is due to creation of lift on windmilling propellers, similar to that for gyroplane.

For using the specified method of realizing the flight when creating the lift counterbalancing the weight on propellers, it is most expedient to use enough high low loaded propellers with hinge fastening of blades to the sleeve thus preventing an excessive increase of angles of attack when alterating the aerodynamic load. The propeller blades are fixed hingedly to the sleeve or hingedly with elasticity in the embedment.

As the alteration of aerodynamic forces of the blade may be done, using deflection of aerodynamic surfaces set on the blade, the leading-edge flaps and trailing-edge flaps, using the alteration of the structure shape, for example, when deflecting the flexible tip of the structure or using the puff, for creating force, normal to the axis of propellers, alongside with alteration of the angle of attack of the blade. Using the cyclic alteration of the structure shape or cyclic inclination of aerodynamic surfaces set on the blades, or cyclic blowing of air currents on the sector of rotation in the first half-turn, ranging from 60° to 120°, if counting from the set direction, with a possibility of increasing the lifting properties of the blade when rotating on the specified sector and increasing the force, normal to the axes of propellers in the set direction.

Hence, the aircraft of vertical take-off using at least two contra-rotating air rotors for hovering will be able, using said method of flight, to fly surpassing significantly the speed of helicopter thanks to the using of air rotors with axes along airflow with inclination of air rotor force and creating thrust and lift force for compensating weight of the aircraft in flight.

In order to reach required horizontal speed aircraft firstly takes off. Increasing rotation rotor reach tip end speed about 250 msec and aircraft fly by creating axial rotor force for weight compensation and using rotor's axes inclination for creating thrust in the same way as helicopter. After fly speed reach 50 m/sec, the value which allows to realise the said flight method, the rotor axes are inclined at about 45° to air flow, rotor tip end speed is decreased so to rich Vre1=1.2-3 and the variation of blade pitch is used to produce lift and thrust force if the rotor axe is inclined to airflow at big angle. Further the rotor axe inclination to the flow may be decreased till 0° with accordance of said flight method. To proceed to said flight method, power plant and transmission must be able to regulate air rotor revolution in wide diapason in order to decrease rotor tip end speed till its speed ratio Vre1 value will be in required diapason.

For flight with low speed 50-100 msec the rotor dimensions must be increased to create required lift force for less ram-air pressure. To realise said flight method rotors with variable pitch blades must be used. Rotor torque must be regulated during revolution, providing stabile rotation speed. Blade twist optimal for said flight method is close to twist of helicopter rotor blade. For instance if $\lambda=6.3$, than blade twist $\alpha_{\kappa p}=21.3°$, where $\alpha_{\kappa p}$—value of angle between chord near pivot and tip chord. Four-blade or multi-blade rotors are preferable for smoothing fluctuation of force, normal to the rotor plane.

Except of vertical horizontal take-off is possible using air rotors according to said method of flight and possibly producing additional lift force by wing. To realise said flight method are used at less two contra-rotating air rotors, disposed not far from the centre of mass (coaxial rotors) or on equal distance from it.

It is possible to use more than two rotors if moments from contra-rotating rotors are balanced in all modes of flight and if additional moments can be produced also by deflection of tail-plane and other control surfaces and by rotor blades cycling.

Air rotors can be disposed at the nose and tail part of aircraft or on the wings. FIG. 18 shows one of the possible configurations of aircraft similar to prototype and analogues, which is able to realise horizontal flight with said method and to rich declared speed diapason.

Said flight method can be used also with other configurations of aircraft.

Cyclic plates can be used for in said method of flight. Against its traditional use in this case the wobbling plates of contra-rotating rotors are turned in contra directions (FIG. 19).

Blade pitch angles are varied according the sine function. Moments on contra-rotating rotors compensate each other and produce force perpendicular to rotors axes.

Cyclic plates can significantly decrease blade angle off attack if rotor axe inclined to airflow at 8-45° and can provide blade pitch angles close to streamline. Pitch angle control provides minimal angles of attack along blade on most part of revolution. Using mechanism of direct control of pitch the angle of attack near required azimuth set at value which let to produce aerodynamic loads efficiently.

The most full using of various blade pitch according to said method of flight can be realized by cyclic plates together with using mechanism of direct pitch control for every blade during revolution in diapason from −15° to +15° in dependence of blade azimuth.

This mechanism consist on actuating cylinder 1, which displace with frequency of rotor revolution and provides required blade 2 pitch angle variation using rod 3, which connected with blade root and rod of said actuating cylinder by hinge. Said mechanism is displaced on every blade between the blade root, fastened on the axe hinge 4 and drive 5 from cyclic plate (not showed at FIG. 37) or variable pitch mechanism of all rotor (not showed at FIG. 37), which set tiling angles in the second axe hinge 6. Blade 2 is fastened to plug 7, mounted to rotor axe 8 with second axe hinge.

Other mechanisms of blade pitch angle variation are possible, for example, using servo, which displaces with rotor rotation frequency and control deflection of surfaces. Air force, produced by surfaces controls the blade pitch. Pitch angle control provides minimal angles of attack along blade on most part of revolution. Using mechanism of direct control of pitch the angle of attack near required azimuth set at value which let to produce aerodynamic loads efficiently.

Hence, the aircraft of vertical take-off using at least two contra-rotating air rotors for hovering will be able, using said method of flight, to fly surpassing significantly the speed of helicopter thanks to the using of air rotors with axes along airflow with inclination of air rotor force and creating thrust and lift force for compensating weight of the aircraft in flight.

When using the offered method the lift value may be increased in process of slowing down the peripheral speed of rotation and increasing the relative speed of the propeller. This will provide the aircraft with the required lift for flight, including the maneuvering in a wide range of speeds including enough low speeds of flight, starting from 50 m/s. The air flow on the propeller along its axis will allow to carry out flight using the offered method, at speeds considerably surpassing the speeds of flight of a helicopter. The reduced speed of a flow on blades will lead to decrease of profile losses and will allow an efficient flight at speeds equal to the highest speeds achievable by screw planes.

The offered method provides the absence of air flow shock stall from blades and the mode of effective thrust, while supporting the absence of reversal areas, as well as the mode of increase of lift while decreasing the efficiency of thrust for maintaining maneuvering when slowing down by air propellers.

Use of variation of setting angles during the blade revolution according to the offered method allows to effectively create the force, normal to propeller, both at strictly axial flow on propellers, and when increasing the angle of axis to the air flow up to 45° with increase of lift with respect to thrust draft thus facilitating the transition from vertical position of axes during the take-off to horizontal in flight.

Use of the offered method for creating the lift on windmilling propellers allows to reduce altitude in case of engine failure or to fly with maneuvering using additional propulsors.

Use of feathering of the blade on the most part of revolution and increase of setting angles basically on sectors of rotation where the blade is close to the position, normal to the set direction, and projection of aerodynamic forces of the blade on the set direction is maximal, leads to increasing the value of the lift with respect to thrust of propellers. Thus the use of strictly axial flow on the propeller allows to carry out most effectively feathering and increase of angles of attack of blades for creating lift and thrust in flight with uniform variation of angles of attack on propeller radius. Feathering of blades may be carried out at angles of the axis to the air flow up to 45°, including the use of sine wave variation of setting angles.

When using a nonsinusoidal variation of blade setting angles, being close to step-like when rotating on sectors where positions of the blade are close to normal to the set direction, they are most fully using the specified sectors of rotation for creating aerodynamic forces in the set direction and increase the lift of propellers.

Thus, the offered method may be used for flight on propellers having axes directed at an angle ranging from 0° to 45° to the air flow both at small speeds up to 50 m/s, and at speeds considerably surpassing the speed of flight of a helicopter, moreover the method allows to create a vector of force of propellers in the set direction in a wide range of values that allows to get the lift when creating the thrust required for flight and maneuvering, as well as to additionally increase the lift in case of declining the efficiency of thrust or in case of slowing down by air propellers for maneuvering.

The invention claimed is:

1. An extended speed range flight method, using thrust vectoring propellers comprising;
    providing at least for two counter-rotating propellers with alterable blade setting angle and setting propeller axes along a flight direction;
    establishing $\alpha_{n0}$ angles of attack on propeller blades by increasing a collective pitch angle $\gamma_{oIII}$ while moving a propeller in incoming airflow along a propeller axis and by offsetting a propeller axis setting angle relative to the incoming air direction from the incoming airflow direction by an $\alpha\alpha_{och}$ angle;
    generating a force perpendicular to the propeller axes and increasing that force together with increasing airspeed and an angle of the propeller axis relative to the direction of the airflow;
    achieving the speed at which a magnitude of the force approaches the weight of aircraft and ensuring that the propeller axes are sufficiently offset upwardly to create a lifting force needed for flight;
    upon reaching the airspeed no less than 50 m/s, slowing down the propeller and setting its relative propeller speed $V_{oTH}=\alpha_{och}/U$ between 1.2 and 3, wherein $\alpha_{och}$ is a speed of the free flow incoming along propeller axis and U is a speed of a propeller blade;
    increasing $\phi_{oIII}$ with an increase of the relative propeller speed and ensuring that the blades' angles of attack are not leading to a stall, and increasing a force normal to the propellers' axes while decreasing circular speed of the propeller tip, while setting the axes of counter-rotating propellers in one direction relative to the incoming airflow at an angle $\alpha_{och}$ ranging from 0° to 45°;
    cyclically varying a pitch angle of the blades to create a maximal blade pitch angle difference between the blades at a first half-turn between 60° and 120° and at a second half-turn between 240° and 300° of each propeller in order to create forces perpendicular to the propellers' axes in a determined direction and control magnitudes of the forces, to vary a difference between maximal and minimal pitch angles during a blade turn of each propeller, and to control a direction and value of the force created by the propellers as well as a lifting force, thrust or a deceleration force during cruising or maneuvering of the flight.

2. A method as defined in claim 1 wherein:
    when setting the propeller axes to the angle ranging from 0° to 2° with respect to the incoming airflow, the blade pitch angles are varied cyclically, reaching their maximal angle values during revolution on the rotation sector ranging from 60° to 120°, reading from the given direction; with generation, alongside with thrust, of the force, normal to the propeller axes in given direction;
    increase of this normal force value along with increase of maximal blade pitch angles during revolution not more than values of the angles, at which the shock stall is observed;
    when setting the propeller axes at an angle ranging from 2° to 8° in given direction, a force normal to the propeller axes in given direction is created with possibility of increase of its value using cyclic blade pitch angle variation. Such variation is essential for creating maximal pitch angles during revolution and not exceeding ones on a revolution sector between 60° and 120° referring from given direction, at which shock stall is detected;
    when setting the propeller axes at an angle ranging from 8° to 45° in given direction, the blade pitch angles are varied cyclically to reach minimal pitch angles during revolution in sector between 60° and 120° referring from given direction thus ensuring decrease of blade angles of attack to values, at which shock stall is not observed; with possibility of creation alongside with thrust, of the force, normal to the propeller axes in given direction and increase of its value during increase of the values of minimal blade pitch angles during revolution.

3. The method as defined in claim 2 wherein the tail plumage for stabilizing the aircraft is used, the aerodynamic rudders are deflected upwards or downwards for creating the moments and controlling the flight direction, the aerodynamic rudders are deflected to the right or to the left for creating the moments and controlling the angular position in the traveling direction, the aerodynamic rudders which on the left and on the right in the opposite sides are deflected for creating the moments and controlling the angular flight bank.

4. A method as defined in claim 2 whereas there is a use of cyclic alteration of structure shape or cyclic alteration of aerodynamic surfaces set on the blades, or cyclic blowing of air currents on the sector of rotation in the first half-turn, ranging from 60° to 120°, if counting from the set direction, with a possibility of increasing in the rotation when rotating in the specified sector and use increasing the force, normal to the axes of propellers in the set direction.

5. A method as defined in claim 1 wherein: blade pitch angles are set to $\phi_{oIII}$, equal to the angles, at which, in axial propeller flow, creation of blades' attack angles $\alpha_{n0}$ is ensured, in this respect following inequation is ensured:

$$\alpha_{n0} + \alpha_{ocu} + \Delta\phi_1 < \alpha_{\kappa pum},$$

where $\Delta\phi_1$—value, on which blade pitch angles in first half of revolution are maximally changed, in relation to the collective pitch angles in case of the use of cyclic blade pitch angle variation
where $\alpha_{\kappa pum}$,—is the angle of attack causing the air flow shock stall on the blade
with possibility of cyclic pitch angles variation in relation to collective pitch angles in first halt of revolution, accordingly to:

$$\phi_{ycT} = \phi_{oIII} + \Delta\phi(\phi),$$

where $\phi_{ycT}$—current blade pitch angle
where $\Delta\phi(\phi)$—value, on which blade pitch angles are changed, relative to the collective pitch angles, in azimuthal rotation of blade at the angle $\phi$
where $\phi$—current angle in azimuth in plane of rotation, formed, if looking to the propeller rotation, between blade and given direction,
for creation of maximal pitch angles change on value $\Delta\phi_1$ in first half of revolution on a rotation sector lying in the range between 60° and 120° if counting from given direction, with possibility of creation of attack angles, not leading to the appearance of shock stall, at which following inequation is ensured:

$$\Delta\phi_1 < \alpha_{\kappa pum}, - \alpha_{n0} - \alpha_{ocu},$$

herewith, at the angle $\alpha_{ocu}$, which complies with inequation:

$$\alpha_{ocu} < \alpha_{\kappa pum}, -\phi,$$

value $\Delta\phi_1 > 0$, where reaching maximal pitch angles in first half of blade revolution on rotation sector, lying in range between 60° and 120° if counting from given direction, achieving change of $\phi_{ycT}$ relatively to $\phi_{oIII}$ on a value $\Delta\phi_1 = \phi_{yCT} - \phi_{oIII}$, and at angles of $\alpha_{ocu}$, ensuring inequation:

$$\alpha_{ocu} > \alpha_{\kappa pum}, - \alpha_{n0},$$

value $\Delta\phi_1 < 0$, where cyclically changing blades' pitch angles for to decrease blades' pitch angles with creation in first half of revolution on rotation sector lying in the range between 60° and 120° if counting from given direction, minimal blade pitch angles with possibility of creation of attack angles ensuring absence of shock stall.

6. A method as defined in claim 5 wherein when rotating the blade if counting from the set direction on the second half-turn the following equation is reached:

$$\phi_{ycT} = \phi oIII$$

thus the $\phi_{oIII}$ is set equal to angles which at an axial flow of propeller provide creating the angles of attack $\alpha_{n0}$ on the blade and the following inequation observed:

$$\alpha_{ocu} < \alpha_{n0}$$

and increasing collective blade pitch angles $\phi_{oIII}$ to ensure non-negative attack angles in second half of revolution on a rotation sector lying between 240° and 300°, with possibility of creation of: the force normal to the propeller axis in given direction; the thrust.

7. A method as defined in claim 5 whereas when rotating of the blade if counting from the set direction on the second half-turn the following equation is reached:

$$\phi_{ycT} = \phi_{oIII},$$

the $\phi_{oIII}$ is reached, equal to angles which in case of axial flow on propeller provide the angles of attack equal to $\alpha_{n0}$, while observing the inequation:

$$\alpha_{ocu} > \alpha_{n0},$$

with a possibility of increasing the force, normal to the axis of propeller in the set direction, in case of simultaneous drop of thrust of the propeller.

8. A method as defined in claim 5 wherein the $\phi_{oIII}$ is set equal to angles which at an axial flow on the propeller provide creating angles of attack $\alpha_{n0}$, on the blade while observing the inequation:

$$\alpha_{n0} - \alpha_{ocu} + \Delta\phi_2 \geqq 0,$$

where $\Delta\phi_2$—value, on which blade pitch angles are maximally offset, in second half of revolution, in relation to the collective pitch angles
the blades setting angles of propeller are cyclically altered and reach the maximal value $\phi_{ycT}$ when rotating on the sector of rotation ranging from 240° to 300° if counting from the set direction, in the second half-turn with respect to $\phi_{oIII}$ as follows:

$$\Delta\phi_2 > \alpha_{ocu} - \alpha_{n0},$$

with a possibility of increasing the force, normal to the axis of propeller in the set direction and creating thrust on the propeller.

9. A method as defined in claim 5 wherein $\phi_{oIII}$ are set equal to angles which, in axial propeller flow provide angles of attack of $\alpha_{n0}$ while ensuring inequation:

$$\alpha_{n0} - \alpha_{ocu} + \Delta\phi_2 < 0,$$

with that blades pitch angles are cyclically varied in second half of revolution, reading rotation-wise from given direction maximally on $\Delta\phi_2$ while ensuring inequation:

$$\Delta\phi_2 < \alpha_{ocu} - \alpha_{n0}$$

with a possibility of increasing the force, normal to the axis of propeller in the set direction, in case of simultaneous drop of thrust of the propeller.

10. A method as defined in claim 9 wherein at least, a propulsor for creating the thrust is used.

11. A method as defined in claim 5 wherein the setting angles of blades in the first half-turn are cyclically altered, if counting from the set direction, according to the following equation:

$$\phi_{ycT} = \phi_{oIII} + \Delta\phi_1 \sin(\phi).$$

12. A method as defined in claim 5 wherein the setting angles of blades in the first half-turn are cyclically altered, if counting from the set direction, according to the following equation:

$$\phi_{ycT} = \phi_{oIII} + \Delta\phi_1 \sin(\phi)$$

and in the second half-turn of revolution, if counting from the set direction, according to the following equation:

$$\phi_{ycT} = \phi_{oIII} + \Delta\phi_2 \sin(\phi).$$

13. A method as defined in claim 5 wherein in first half of revolution on rotation sector lying between 0° and 75°, reading rotation-wise from given direction, pitch angles are increased to reach its maximal values on first half of revolution while not allowing pitch angles to decrease on value more than 2° on sector starting between 60° and 75°, and ending between 95° and 120°.

14. A method as defined in claim 5 wherein in first half of revolution on rotation sector lying between 0° and 75°, reading rotation-wise from given direction, pitch angles are increased to reach its maximal values on first half of revolution while not allowing pitch angles to decrease on value more than 2° on sector starting between 60° and 75°, and ending between 95° and 120° and in the second half-turn on the sector of rotation ranging from 180° to 245°, if counting from the set direction, the setting angles are reduced, the setting angles reach the least value on the second half-turn and increasing the angles over 2°, on the sector beginning between 240° and 255° and terminating between 285° and 300° is prevented.

15. A method as defined in claim 5 wherein the following angles are set establish:

$$\phi_{o\text{Ш}} = \phi_{y c T \phi}$$

where $\phi_{y c T \phi}$—pitch angle, at which propeller feathering in its axial flow is ensured, with possibility of ensuring minimal blades' attack angles, and in case of rotation of the blade on the sectors ranging from 0° to 45° and from 135° to 360°, if counting from the set direction, the setting angles with respect to angles of the main pitch cyclically vary according to equation:

$$\phi_{y c T} = \phi_{o\text{Ш}} + \Delta\phi_2 \sin(\phi),$$

moreover the value is set:

$$\Delta\phi_2 = \alpha_{\text{осн}}$$

with a possibility of varying the setting angles for maintaining on the blade the angles of feathering in various azimuthal positions during the blade rotation within the limits of specified sectors.

16. The method as defined in claim 1 wherein there is an additional alteration of blade setting angles during revolution, while reducing as much as possible the setting angles achieved on each propeller on azimuths, laying in the same direction on each propeller, and being increasing as much as possible on opposite azimuths with a possibility of creating the moment normal to axes of propellers.

17. The method as defined in claim 1 wherein the wing is used and it is oriented to the incoming air flow at an angle of attack ranging from 0° to 10° for increasing the additional lift supporting in flight while increasing the angle of attack, and for controlling the bank of aircraft in flight the wing ailerons deflection may be used.

18. A method as defined in claim 1 wherein the specified relative speed of the propeller is reach by reducing the peripheral speed of the propeller, due to variating the radius of propellers, with a possibility of increasing the force, normal to the axis of the propeller, to the thrust in process of reducing the radius of propellers.

19. A method as defined in claim 1 whereas the blades of propellers on a sleeve are fixed hingedly or hingedly with elasticity in rigid support with a possibility of use of aerodynamic loads arising as a result of altering the aerodynamic during a revolution of oscillations of the blade around of the hinge in embedding for obtaining an alteration of angles of attack of blade with the purpose of nonadmission of angles of the attack resulting in air flow shock stall, as well as for altering the peripheral speed of the ends of blades during a revolution.

* * * * *